United States Patent
Cousins et al.

(10) Patent No.: US 11,644,597 B2
(45) Date of Patent: *May 9, 2023

(54) AUTOMATED PROCESSING AND COMBINATION OF WEATHER DATA SOURCES FOR WEATHER SEVERITY AND RISK SCORING

(71) Applicant: Athenium LLC, Washington, DC (US)

(72) Inventors: Ellen Dee Cousins, Rockville, MD (US); Stefan Francis Cecelski, Odenton, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/213,186

(22) Filed: Mar. 25, 2021

(65) Prior Publication Data

US 2021/0396909 A1  Dec. 23, 2021

Related U.S. Application Data

(62) Division of application No. 16/200,805, filed on Nov. 27, 2018, now Pat. No. 10,962,681.

(60) Provisional application No. 62/591,234, filed on Nov. 28, 2017.

(51) Int. Cl.
   *G06F 11/30* (2006.01)
   *G01W 1/10* (2006.01)
   *G01W 1/14* (2006.01)

(52) U.S. Cl.
   CPC .............. *G01W 1/10* (2013.01); *G01W 1/14* (2013.01)

(58) Field of Classification Search
   CPC ....................................................... G01W 1/10
   See application file for complete search history.

(56) References Cited

U.S. PATENT DOCUMENTS 8,280,633 B1  10/2012  Eldering et al.
10,962,681 B2 *  3/2021  Cousins ................ G01W 1/14

OTHER PUBLICATIONS

Charles C. Ryerson & Allan C. Ramsay, J. "Quantitative Ice Accretion Information-from the Automated Surface Observing System." Applied Meteorology and Climatology (Sep. 2007).
McKay, G. A., and FLA Thompson. "Estimating the hazard of ice accretion in Canada from climatological data." Journal of Applied Meteorology 8.6 (1969): 927-935.

(Continued)

*Primary Examiner* — Phuong Huynh

(57) ABSTRACT

A computer-based method for identifying ice storm risk across a geographical extent includes receiving, at a computer-based ice storm risk calculation system, historical data regarding a plurality of past ice storms. The historical data includes, for each respective one of the plurality of past ice storms, data about the size of the geographical region that was impacted by the ice storm, the thickness of ice that accumulated from the ice storm, and qualitative data (e.g., written observations in new reports, etc.) reflecting human observations of the ice storm's impact. The method further includes calculating an ice storm severity index based, in part, on the size of the geographical region that was impacted by the ice storm and the thickness of the accumulated ice that resulted from the ice storm, and validating the calculated ice storm index with the qualitative data reflecting the human observations of the ice storm's impact.

20 Claims, 5 Drawing Sheets

(56) References Cited

OTHER PUBLICATIONS

Bendel, William B., and Dawna Paton. "A review of the effect of ice storms on the power industry." Journal of Applied Meteorology 20,12 (1961): 1445-144.

Squires, M.F., J.H. Lawrimore, R.R. Heim, D.A. Robinson, M.R. Gerbush, and T.W. Estilow, 2014 The Regional Snowfall Index. Bull. Amer. Meteor. Soc., 95, 1835-1848, https://doi.org/10.1175/BAMS-D-13-00101.1 <http://doi. org/10.1175/BAMS-D-13-00101.1 >.

\* cited by examiner

AUTOMATED PROCESSING AND COMBINATION OF WEATHER DATA SOURCES FOR WEATHER SEVERITY AND RISK SCORING

CROSS-REFERENCE TO RELATED APPLICATIONS

This application is a divisional application to U.S. patent application Ser. No. 16/200,805 filed Nov. 27, 2018, now allowed, which claims priority to U.S. Provisional Patent Application No. 62/591,234, entitled AUTOMATED SEVERITY-BASED RISK SCORING FOR ICE STORMS AND FREEZING RAIN, which was filed on Nov. 28, 2017, both of which are incorporated herein by reference in their entirety.

FIELD OF THE INVENTION

This disclosure relates to ice storms and freezing rain and, more particularly, automated severity-based risk scoring for ice storms and freezing rain.

BACKGROUND

Freezing rain events and their more severe counterpart, ice storms, may occur when precipitation falls through atmospheric layers with differing thermal profiles. When precipitation begins in a sub-freezing environment aloft in the atmosphere, it begins to fall as snow. If lower levels of the atmosphere are above freezing, this falling snow will melt into rain droplets. When rain encounters a surface environment that is below freezing, the rain freezes on contact with the sub-freezing surfaces, and it is termed freezing rain. This freezing rain can accrete on the surfaces and objects below freezing, such as trees, powerlines, and roads, potentially causing substantial damage and travel delays. Freezing rain events with damaging ice accretion are generally included in what is referred to as ice storms in this document.

Freezing rain events and ice storms are uniquely damaging weather events that impact many areas around the globe. They often result in widespread disruption, including loss of electricity, impassable roads, and downed trees and power lines. Some estimates place the annual insured losses attributable to winter storms to over $2 billion a year, and severe individual events, like the 1998 Ice Storm affecting a larger portion of North America, including major metropolitan centers in the United States and Canada, can top even that annual amount.

It may be desirable for affected communities, the insurance industry, and others to accurately understand and account for the level of ice storm risk at one or more particular locations.

SUMMARY OF THE INVENTION

In one aspect, a computer-based method is disclosed for identifying ice storm risk across a geographical extent (e.g., across the contiguous United States). The method includes receiving, at a computer-based ice storm risk calculation system, historical data regarding a plurality of past ice storms. The historical data includes, for each respective one of the plurality of past ice storms, data about the size of the geographical region that was impacted by the ice storm, the thickness of ice that accumulated from the ice storm, and qualitative data (e.g., written observations in news reports, etc.) reflecting human observations of the ice storm's impact. The method further includes calculating an ice storm severity index based, in part, on the size of the geographical region that was impacted by the ice storm and the thickness of the accumulated ice that resulted from the ice storm, and validating the calculated ice storm index with the qualitative data reflecting the human observations of the ice storm's impact.

In another aspect, a computer system is disclosed that includes a plurality of data sources (e.g., the Cold Regions Research and Engineering Lab (CRREL) database of damaging ice storms 102a, the ground station Meteorological Terminal Aviation Routine (METAR) weather reports database 102b, and the quality-controlled daily summaries of ground station weather data from the Global Historical Climatology Network (GHCN) 102c), a computer-based ice storm risk calculation system, and a plurality of computer-based user terminals (e.g., laptops, desktops, tablets, smart phones, etc.). The plurality of data sources, the computer-based ice storm risk calculation system, and the plurality of computer-based user terminals are coupled to one another for communication via a network (e.g., the Internet).

The computer-based ice storm risk calculation system has a computer-based processor, and a computer-based memory coupled to the computer-based processor. The computer-based processor is configured to execute instructions stored in the computer-based memory and to perform various steps that include receiving historical data regarding a plurality of past ice storms from a first one of the data sources (e.g., CRREL), as well as the other data sources. The historical data from CRREL includes, for each respective one of the plurality of past ice storms, data that indicates: a size of a geographical region that was impacted by the ice storm, a thickness of accumulated ice that resulted from the ice storm (when such data is available), and qualitative data (e.g., reports in printed publications) reflecting human observations of the ice storm's impact. The processor calculates an ice storm severity index based (for each respective storm), at least in part, on the size of the geographical region that was impacted by the ice storm and the thickness of the accumulated ice that resulted from the ice storm. The processor also validates the calculated ice storm index with the qualitative data reflecting the human observations of the ice storm's impact.

The computer system is configured to make available at one or more of the computer-based user terminals a gridded geographic map with a plurality of grid cells, where each respective grid cell has a corresponding risk level that is viewable or accessible from the computer-based user terminal.

In some implementations, one or more of the following advantages are present.

In various implementations, the techniques and technologies disclosed herein provide for a relatively comprehensive risk scoring paradigm utilizing a broad risk scoring scheme that analyzes severity based in part on multiple historical-based severity indicators. This paradigm, in various implementations, calculates ice storm and/or freezing rain risk at one or more locations based on the historical probability of an event combined with other information, such as a comprehensive analysis of risk using multiple severity indicators. These severity indicators can include, for example, reported ice thickness and/or textual analysis of news and observer reports. The paradigm, in various implementations, also, or alternatively, calculates severity based on total freezing rain precipitation amounts recorded, which historically may be more accurate than other imperfect gauges of ice accretion. This robust severity scoring methodology may be coupled with frequency information to yield a risk score that can be displayed graphically to allow easy interpretation of risks across geographic areas.

Other features and advantages will be apparent from the description and drawings, and from the claims.

BRIEF DESCRIPTION OF THE DRAWINGS

Like reference numerals refer to like elements.

DETAILED DESCRIPTION

Figure 1:
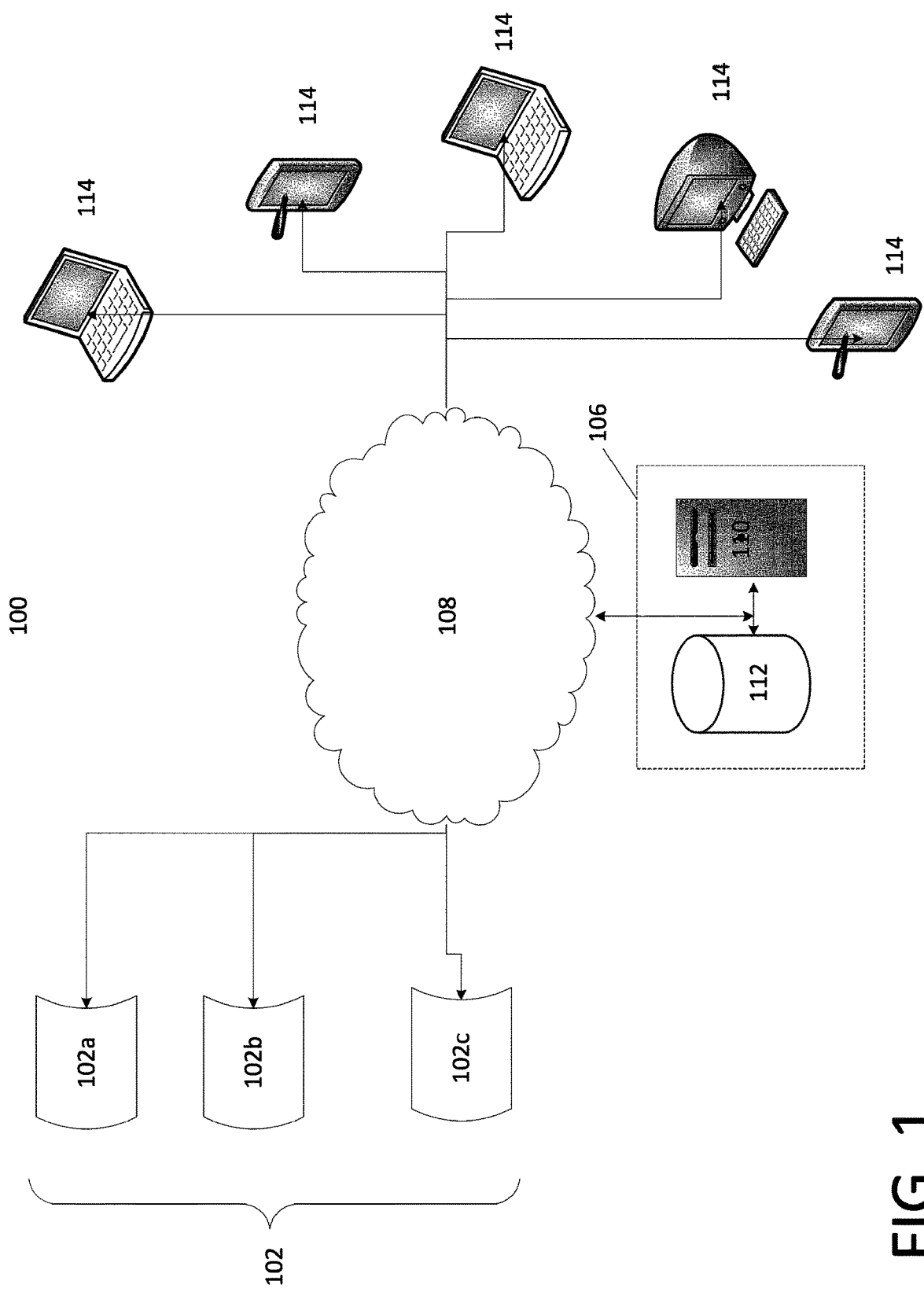
FIG. 1 is a schematic representation of an exemplary computer-based network that includes a highly-accurate system for identifying ice storm risk with a high degree of granularity across a geographical extent.

FIG. 1 is schematic representation of an exemplary computer network 100 configured to facilitate and perform automatic calculation of severity-based risk scores for ice storms and freezing rain.

The network 100 has multiple sources (102a, 102, 102c) of historical weather-related data that include both quantitative and qualitative historical information about past ice storms and freezing rain events. The network 100 also has an exemplary system 106 for automated severity-based risk scoring for ice storms and freezing rain (referred to herein, in some places, as an "automated risk calculation system," or the like, or simply "system 106"). The network 100 also has a plurality of computer-based user terminals 114. The sources of historical weather-related data (102a, 102b, 102c), the system 106 for automated risk calculation, and the user terminals are all coupled together as shown via a network 108 (e.g., the Internet).

In the illustrated implementation, and as discussed herein in detail, the sources of historical weather-related data include the Cold Regions Research and Engineering Lab (CRREL) database of damaging ice storms 102a, a ground station Meteorological Terminal Aviation Routine (METAR) weather reports database 102b, and quality-controlled daily summaries of ground station weather data from the Global Historical Climatology Network (GHCN) 102c. Of course, in other implementations, different sources of historical weather-related data may be used. Likewise, in some implementations, more or less than three sources of historical weather-related data may be user.

The system 106, in the illustrated implementation, has both processing (110) and memory storage (112) capabilities/modules. In various implementations, the processing module can include any number of (one or more) processors to perform and/or facilitate the various processing functionalities disclosed herein as being attributable to system 106. Likewise, in various implementations, the memory storage module 112 can include any number of (one or more) memory storage devices configured to perform or facilitate one or more of the memory storage functionalities disclosed herein as being attributable to or for the system 106. The processing functionalities and/or the memory storage functionalities can be located in one geographic place, or can be distributed geographically across different locations.

The computer-based user interface devices 114 can include virtually any kind of computer-based devices including, for example, laptops, tablets, desktops, etc.

The system 100 is generally configured to download various historical data from the sources of historical weather-related data (102a, 102b, 102c), process that data, produce a geographical map divided with a grid into discrete cells, and produce a risk score for each cell that represents a probability of damage occurring from either ice storms or freezing rain in the geographical region that corresponds to the associated cell. As discussed herein, the risk assessment in this regard is extremely robust, accurate, and granular. In a typical implementation, the risk assessment information that the system produces, and/or any raw data that the system receives, can be presented to a system user at any one of the system's computer-based user terminals 104. As an example, the system 100, in this regard, might present at one of the system's computer-based user terminals, a visual representation of a gridded geographical map with corresponding risk assessment information (e.g., risk scores) associated with each cell in the grid. In various implementations, the user may be able to interface with and/or access system information from one or more of the computer-based user terminals 104 in a number of different ways, some of which are described herein.

Figure 2:
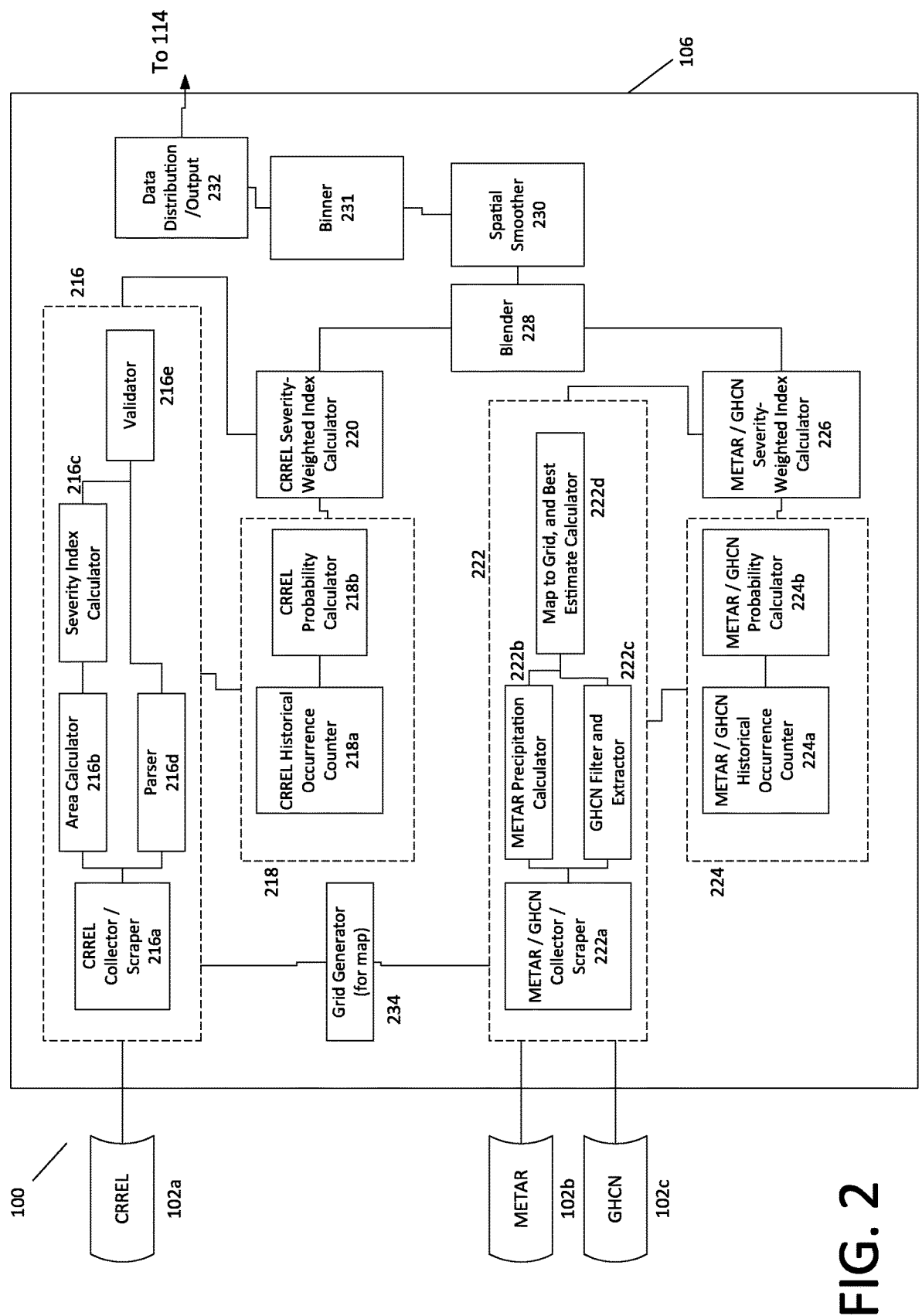
FIG. 2 is a schematic representation of the network in FIG. 1 with a more detailed view of the highly-accurate system for identifying ice storm risk with a high degree of granularity across a geographical extent.

FIG. 2 is a partial schematic diagram of the network 100 in FIG. 1 showing a detailed view of an exemplary configuration for the automated risk calculation system 106.

The automated risk calculation system 106 in the illustrated implementation is connected, at its input side, to the three sources of historical weather-related data in FIG. 1: the Cold Regions Research and Engineering Lab (CRREL) database of damaging ice storms 102a, a ground station Meteorological Terminal Aviation Routine (METAR) weather reports database 102b, and quality-controlled daily summaries of ground station weather data from the Global Historical Climatology Network (GHCN) 102c. The automated risk calculation system 106 in the illustrated implementation is connected, at its output side, to one or more computer-based user terminals (see "to 114").

The internal components of an automated risk calculation system 106 and the specific configuration of those internal components can vary. FIG. 2 shows one such example thereof. In some implementations, one or more (or all) of the components in the illustrated automated risk calculation system 106 can be implemented as one or more discrete physical components. In some implementations, one or more (or all) of the components in the exemplary automated risk calculation system 106, and their respective functionalities, can be implemented by the system's 106 processor 110 executing software instructions stored on the system's computer-based memory storage 112 (or elsewhere), and any associated memory storage functionalities may be supported (or performed) by the computer-based memory storage 112 (or other memory) as well.

At a high level, the automated risk calculation system 106, including the exemplary components and configuration represented in FIG. 2, is operable to (and does) perform and/or facilitate performance of the various processing functionalities disclosed herein as attributable to the automated risk calculation system 106.

The illustrated automated risk calculation system 106 is conceptually organized into a CRREL ingesting and pre-processing module 216, a CRREL probability estimator 218, a CRREL severity-weighted risk index calculator 220, a METAR/GHCN ingesting and pre-processing module 222, a METAR/GHCN probability estimator 224, a METAR/GHCN severity-weighted index calculator 226, a risk index blender 228, a spatial smoother 230, and a data distribution/output module 232.

The CRREL ingestion and pre-processing module 216 has a CRREL data collector/scraper 216a, a geographical area calculator 216b, a CRREL severity index calculator 216c, a parser 216d, and a CRREL severity index validator 216e.

The CRREL probability estimator 218 has a CRREL historical occurrence counter 218a, and a CRREL probability calculator 218b.

The METAR/GHCN ingestion and pre-processing module 222 has a METAR/GHCN data collector/scraper 222a, a METAR precipitation calculator 222b, a GHCN filter and extractor 222c, and a map-to-grid/best estimate calculator 222d.

The METAR/GHCN probability estimator 224 has a METAR/GHCN historical occurrence counter 224a, and a METAR/GHCN probability calculator 224b.

The automated risk calculation system 106 also has a grid generator 234 that can generate a grid and/or superimposing that grid onto a geographical map.

The internal components in an automated risk calculation system 106 can be coupled together (e.g., to facilitate communications therebetween) in a variety of different possible ways. One such way is represented in the implementation shown in FIG. 2.

According to the illustrated implementation, the CRREL ingesting and pre-processing module 216 is connected to the CRREL probability estimator 218, and the CRREL ingestion and pre-processing module 216 and the CRREL probability estimator 218 are connected to the CRREL severity-weighted risk index calculator 220. Moreover, the METAR/GHCN ingesting and pre-processing module 222 is connected to the METAR/GHCN probability estimator 224, and the METAR/GHCN ingesting and pre-processing module 222 and the METAR/GHCN probability estimator 224 are connected to the METAR/GHCN severity-weighted index calculator 226. The CRREL severity-weighted risk index calculator 220 and the METAR/GHCN severity-weighted index calculator 226 are connected to the risk index blender 228. The risk index blender 228 is connected to the spatial smoother 230. The spatial smoother 230 is connected to a data distribution/output module 232. The grid generator 234 is connected to the CRREL ingesting and pre-processing module 216 and to the METAR/GHCN ingesting and pre-processing module 222.

Within the CRREL ingesting and pre-processing module 216, the CRREL data collector/scraper 216a is connected to the geographical area calculator 216b and to the parser 216d, the geographical area calculator 216b is also connected to the CRREL severity index calculator 216c, the CRREL severity index calculator 216c is also connected to the CRREL severity index validator 216e, and the parser 216d is connected to the CREEL data collector/scraper 216a and to the CRREL severity index validator 216e.

Within the CRREL probability estimator 218, the CRREL historical occurrence counter 218a is connected to the CRREL probability calculator 218b.

Within the METAR/GHCN ingesting and preprocessing module 222, the METAR/GHCN collector/scraper 222a is connected to the METAR precipitation calculator 222b and to the GHCN filter and extractor 222c, and the METAR precipitation calculator 222b and the GHCN filter and extractor 222c are connected to the map-to-grid/best estimate calculator 222d.

Within the METAR/GHCN probability estimator 218, the METAR/GHCN historical occurrence counter 218a is connected to the METAR/GHCN probability calculator 218b.

Figure 3:
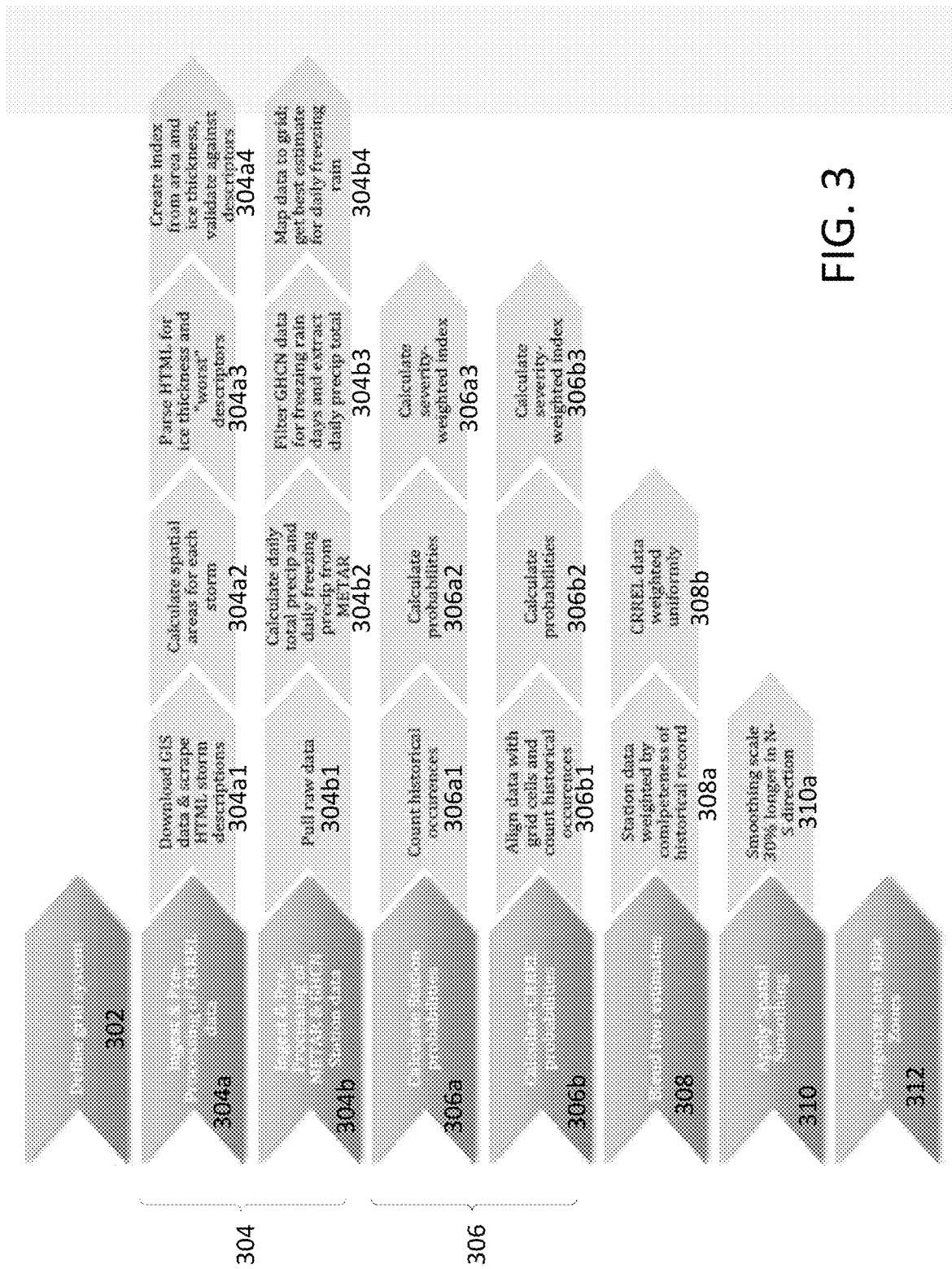
FIG. 3 is a flowchart of a process performed by the network of FIG. 1.

FIG. 3 is a flowchart showing an exemplary implementation of a process for automatically calculating severity-based risk scores for ice storms and freezing rain. The process represented in the illustrated flowchart may be implemented, for example, by the system 100, and components, in FIGS. 1 and 2.

According to the illustrated flowchart, the process (at 350) includes defining a grid that has a plurality of cells.

In a typical implementation, the system 106 (e.g., grid generator 234) superimposes the grid on a geographical map so that the grid and, more particularly the cells of the grid, will define discrete geographical regions represented by the map. The system 106 may assign an individual risk score to each respective one of the grid cells based on a calculated risk that damaging ice storms or freezing rain events might occur, or cause damage, in the corresponding geographical region. In a typical implementation, the system makes this information viewable/accessible from one or more computer-based user terminals of the system 106. More particularly, in this regard, the system 106 may present or make available for viewing, at the screen of one of the system's computer-based user terminals, a map with the superimposed grid and a score in, or associated with, each respective cell in the grid.

The process of defining, or generating, the grid can be done in a number of different ways. Typically, this process includes defining the various properties of the grid (e.g., cell size, cell shape, etc.) that will be produced and superimposed over the geographical map.

The grid properties that may be specified during this process include one or more (or all) of the following: type of grid (e.g., geodesic, etc.), where (over the map) the grid should appear, how the grid should be aligned with the map, grid resolution (e.g., cells per unit of area), cell size, cell shape, etc.

These properties may be defined automatically (e.g., based on preprogrammed instructions being executed by the system 106), or manually (e.g., in response to a user manually entering values for the properties in response to user prompts that appear at one of the system's computer-based user terminals), or by some combination of automatic and manual processes. If any of the grid properties are to be entered manually, then the system 106 may be present to the user a series of prompts, each referring to a different property of the grid being defined.

Defining the grid enables the system 106 to present precise risk data in a grid-based environment that can provide a high degree of granularity. This high degree of granularity can, if sufficiently granular, be particularly advantageous over city-wide or region-wide risk scoring/event prediction schemes. Moreover, grid-based scoring can help users easily and quickly digest risk information by providing the risk information in an intuitive, easy-to-use, and easy-to-understand graphical format. This sort of graphical, grid-based format also makes it easy to discern patterns in the risk information that otherwise might be difficult to recognize or appreciate.

In an exemplary implementation, the grid is geodesic with hexagonal cells. In general terms, a geodesic grid uses triangular tiles based on the subdivision of a polyhedron and can be used to subdivide the surface of the Earth (or some portion of the Earth, e.g., the United States) represented on a map into cells. This kind of grid generally does not have a straightforward relationship with latitude and longitude. Typically, the size and shape of each cell in a geodesic grid is identical even near the poles where many other spatial grids might have singularities or heavy distortions.

In one exemplary implementation, the system's 100 grid generator performs or at least facilitates the grid defining process. In this regard, the grid generator may utilize or leverage one or more functions from the SPHEREPACK™ open-source software library. The SPHEREPACK™ open-source software library is a collection of FORTRAN77™ programs and subroutines that can be used to facilitate computer modeling of various processes. In this regard, the SPHEREPACK™ functionalities can be used to locate centroids of the geodesic cells relative to the map, and to perform other associated functionalities including, for example, generating hexagonal boundaries of the geodesic cells by performing the geometrical calculations to define the boundaries of the hexagons in latitude and longitude coordinates, and matching the resolution and orientation of the hexagons with the cell centroids.

The grid can end up having any one of a variety of different configurations. For example, the grid need not be geodesic; the grid can have virtually any other convenient configuration, with cells of virtually any size and shape. Moreover, the size and shape of the cells need not be uniform throughout the grid. In some implementations, the cells can have a size and shape that corresponds to certain latitudinal and longitudinal lines, or that corresponds to geographical borders of certain cities or towns, or other geographical or topographical features. The grid can have virtually any kind of resolution (e.g., from 1 kilometers to 30 kilometers or more).

In one exemplary implementation, the grid will cover the entire contiguous United States and has a 15 kilometer resolution (i.e., the distance between the centroids of any two neighboring cells is 15 kilometers).

In the next part of the process (at 304), the system 106 ingests data that is relevant to the risk of damaging ice storms and/or freezing rain events for use in creating the cell-specific risk scores. The data that the system 106 ingests in this regard can include a variety of different data types and can come from a variety of different sources typically outside of the system 106. Generally speaking, the ingested data is historical in nature (i.e., the data relates to ice storms and freezing rain events that have happened in the past). Moreover, in a typical implementation, the ingested data includes at least some quantitative data and at least some qualitative data about the ice storms and freezing rain events of interest. The quantitative information can include, for example, start dates, end dates, shape information, size information, latitudes, longitudes, ice thicknesses, hour-by-hour precipitation estimates, etc. The qualitative information can include published articles, or other reliable qualitative reports, and/or excerpts thereof that describe the past ice storms or freezing rain events of interest. In a typical implementation, the system 106 leverages both the quantitative data and the qualitative information to produce a robust, highly accurate, and highly granular risk scores for different cells across a particular geographical extent.

According to the illustrated implementation, the system 106 ingests three data sets from:
1. The Cold Regions Research and Engineering Lab (CRREL) database of damaging ice storms (at 304*a*),
2. Ground station Meteorological Terminal Aviation Routine (METAR) weather reports (at 304*b*), and
3. Quality-controlled daily summaries of ground station weather data from the Global Historical Climatology Network (GHCN) (also at 304*b*).

CRREL is a United States Army Corps of Engineers, Engineer Research and Development Center research facility headquartered in Hanover, N.H. CRREL provides scientific and engineering support to the U.S. government, its military, and others with a core emphasis on information about cold environments. CRREL maintains a database that includes information, including quantitative information, about damaging ice storms. That database is accessible through CRREL's Damaging Ice Storm Geographic Information System ("GIS"). CRREL also maintains webpages with HTML ("hypertext markup language") descriptions of published articles (e.g., newspaper articles, magazine articles, etc.) that describe the past ice storms or freezing rain events of interest. These articles may include some quantitative information (e.g., ice thicknesses, storm locations, amounts of precipitation, etc.) about the ice storms and freezing rain events, but also may contain qualitative (or non-quantitative) information about the ice storms and freezing rain events and their potentials for causing property damage or destruction (e.g., describing certain storms as the "worst," or "most destructive," or "most harmful" storm of the year, etc., referred to herein as "worst" descriptors). In a typical implementation, the system 106 (e.g., the CRREL ingesting and pre-processing module 216, at 304*a*) would ingest and preprocess both quantitative and qualitative data from CRREL.

More particularly, according to the illustrated implementation, the system 106 (at 304*a*) ingests and preprocesses data from CRREL by: downloading (mostly quantitative) GIS data and scraping (mostly qualitative) HTML storm descriptions from CRREL (at 304*a*1), calculating spatial areas for each storm (at 304*a*2), parsing the HTML for ice thicknesses and "worst" descriptors (at 304*a*3), and creating indices from area information and ice thicknesses and validating those indices against (qualitative) descriptors (at 304*a*4).

In a typical implementation, (at 304*a*1) the GIS data may be downloaded (e.g., by the CRREL collector scraper) from CRREL's GIS database via a wireless network (e.g., the Internet). The GIS data can be downloaded manually or automatically (e.g., at set times, whenever new GIS data becomes available at CRREL's GIS database, in response to a prompt from a system user or component, etc.).

The downloaded GIS data can have any one of a variety of different formats or combinations of formats and/or data types. For example, in an exemplary implementation, at least some of the downloaded information is in a shapefile format. The shapefile format is a popular geospatial vector data format for GIS systems to encode geographical information into a computer file. The shapefile format can spatially describe vector features: points, lines, and polygons, representing items such as water wells, rivers, lakes, storms, etc. Each item may have one or more attributes, represented in the shapefile, that describe the item, such as name, temperature, ice thickness, etc. In some implementations, the downloaded GIS data can include quantitative data, such as identification numbers for the ice storms, start and end dates for the ice storms, information about the geographical extent/size of the ice storms (e.g., number of acres and the perimeter surrounding the area affected for each ice storm), etc.

Table 1, below, shows an example of data that may be downloaded from the CRREL GIS by system 106.

TABLE 1

Raw CRREL data prior to metadata transforms and severity indicator creation

| ID | START_DATE | END_DATE | SOURCETHM | AREA | PERIMETER | ACRES |
|---|---|---|---|---|---|---|
| 339 | Jan. 11, 1956 | Jan. 19, 1956 | Fp09_all.shp | 32195.898 | 706.719 | 321962793.6 |
| 340 | Mar. 7, 1956 | Mar. 11, 1956 | Fp09_all.shp | 6160.254 | 337.36 | 61603381.39 |
| 346 | Dec. 6, 1958 | Dec. 18, 1958 | Fp09_all.shp | 2198.356 | 198.095 | 21983573.15 |
| 346 | Dec. 6, 1958 | Dec. 18, 1958 | Fp09_all.shp | 1848.129 | 157.036 | 18481346.42 |
| 347 | Jan. 12, 1982 | Jan. 20, 1982 | Fp09_all.shp | 237295.071 | 3617.943 | 2372964091 |
| 347 | Jan. 12, 1982 | Jan. 20, 1982 | Fp09_all.shp | 1709.565 | 233.26 | 17095468.69 |
| 349 | Feb. 8, 1959 | Feb. 13, 1959 | Fp09_all.shp | 81335.075 | 2210.137 | 813345774.4 |
| 351 | Dec. 15, 1982 | Jan. 3, 1982 | Fp09_all.shp | 3250.198 | 209.183 | 32501941.11 |
| 352 | Dec. 11, 1959 | Dec. 15, 1959 | Fp09_all.shp | 22152.093 | 534.441 | 221521633.7 |
| 353 | Dec. 23, 1959 | Jan. 6, 1960 | Fp09_all.shp | 4681.588 | 293.862 | 46815730.97 |
| 361 | Mar. 17, 1984 | Mar. 21, 1984 | Fp09_all.shp | 129135.661 | 1572.606 | 1291362622 |
| 364 | Mar. 2, 1985 | Mar. 7, 1985 | Fp09_all.shp | 8761.616 | 533.28 | 87615618.39 |
| 364 | Mar. 2, 1985 | Mar. 7, 1985 | Fp09_all.shp | 140889.647 | 3124.441 | 1408858004 |

This exemplary table includes data that relates to ten different ice storms. Each ice storm is identified by its own unique, CRREL-assigned, identification number: 339, 340, 346, 347, 349, 351, 352, 353, 361, and 364. The data in the table includes, for each represented storm: the unique, CRREL-assigned, identification number (in the ID column), a start date (in the START DATE column), an end date (in the END DATE column), a shapefile (in the SOURCETHM column) that contains the geographical shape of the storm, and other information about the geographical extent of the storm's impact (in the AREA column, the PERIMETER column, and the ACRES column, which may be derived from information in the shapefile).

For most of these storms (e.g., ID numbers 339, 340, 349, 351, 352, 353, and 361) there is only one line of data in the table, but for some (e.g., ID numbers 346, 347, and 364) there are two lines of data in the table. For the storms that have more than one line of data, each line may relate to a different geographical region that was affected by the storm. For example, the first line of data for storm 346 may relate to that storm's activity in a first geographical region, and the second line of data for storm 346 may relate to that storm's activity in a second geographical region that is different than the first geographical region. The second geographical region may be adjacent to the first geographical region.

In some implementations, for the storms that have more than one data entry (like storms 346, 347, and 364) in a data collection such as the one in Table 1, the system 106, when it receives such data, will combine the multiple entries into one. The system 106 may do this, at least in part, by superimposing the geographical shape of the storm shown in both of the corresponding shapefiles and then calculating a new area, perimeter, and/or acres based on the resulting new (combination) storm shape.

Referring again to FIG. 3, the process (still at 304a1) includes scraping storm description data from the HTML webpages maintained by CRREL that describe past ice storms or freezing rain events. The data scraped from these HTML webpages can be quantitative in nature (e.g., values for ice thickness), qualitative in nature (e.g., statements characterizing certain storms as the "worst," "most destructive," "most harmful" of the year, etc.), or a combination of quantitative and qualitative data. The scraping can be manual (e.g., by a user sifting through articles/publications at CRREL's website from one of the system's computer-based user terminals) or automatic (e.g., by a computer-based web scraper being executed by the system 106). A computer-based web scraper can be implemented as an application programming interface (API) that gathers and copies data, typically into a central local database or spreadsheet (maintained by the system 106), for later retrieval and/or analysis.

In a typical implementation, the data gathered or copied by the web scraper includes entire articles/publications/reports that are available at CRREL's website. These articles/publications/reports typically are organized into a nested, indexed (by CRREL), collections of linked webpages in HTML format. In some implementations, the web scraper acts as a web crawler and navigates through the nested, indexed, collections of linked webpages in a systematic manner, and fetches the article/publication/report at each webpage automatically (without ongoing user involvement) for later processing and/or data extraction.

In some implementations, of course, the web scraping process can be more limited and nuanced. In those implementations, the web scraper may be configured to fetch (download) only certain types of information from each web page it accesses. In this regard, the web scraper may be configured to search for (and copy only) information from the webpages that is relevant to determine the severity, destructive capacity, and/or harmfulness of each associated storm. This information can include, for example, storm names, storm locations, ice thickness amounts, "worst" descriptors, whether trees were downed, whether electrical power was interrupted, etc. In implementations where the web scraper performs this more limited and nuanced fetching protocol, the web scraper may access a preprogrammed list of search terms and phrases to find storm names, storm locations, ice thickness amounts, "worst" descriptors, whether trees were downed, whether electrical power was interrupted, etc. at each webpage it access.

Next (at 304a2), according to the illustrated implementation, the system 106 (e.g., area calculator 216b) calculates a spatial area for each storm. In a typical implementation, these calculations are performed based on the geospatial data obtained from CRREL (e.g., in the shapefile, which identifies the geographical region that was impacted by the corresponding storm). This step may be redundant, particularly if the data downloaded from CRREL included a value of spatial area for each storm (as shown above in Table 1). However, performing a spatial area calculation (at 304a2) independent of any spatial area calculations performed by CRREL or spatial area data provided by CRREL can be used as a double check or confirmation of the CRREL-provided data. In many instances, the spatial area calculation performed by the system 106 (at 304a2) will yield a result that is identical to, or at least very close to the spatial area data provided by CRREL.

Of course, in various implementations, any subsequent steps or calculations that the system 106 performs that may require a spatial area value for the storm can utilize the data obtained from CRREL. Therefore, in some implementations, step 304a2 in FIG. 3 can be dispensed with entirely.

In a typical implementation, any data obtained from CRREL, or derived from the data obtained from CRREL, is stored by the system 106 in computer-based memory storage (e.g., in a database or the like).

Next (at 304a3), according to the illustrated implementation, the system 106 (e.g., parser 216d) parses the HTML documents that were downloaded/scraped from CRREL's webpages for information that may be relevant to the severity and/or destructive nature and capacity of each associated storm. In some implementations, this parsing process may include searching each respective document for specific words or phrases such as specific storm names, names of locations, ice thickness amounts (e.g., including words or abbreviations for "inches," "centimeters," etc., words like "worst," "terrible," "destructive," etc., and/or words or phrases that suggest that trees may have been downed, that electrical power may have been interrupted, etc.

In a typical implementation, the searching or parsing may be conducted by a computer-based parser that includes one or more computer-based processors executing software that supports and facilitates the searching functionalities. Moreover, the specific words and/or phrases that the parser searches for may be preprogrammed into computer-based memory or may be customizable by a user in computer-based memory.

In some implementations, the textual words and/or phrases that get identified by the parsing process are saved into computer-based memory for later reference.

Next (at 304a4), according to the illustrated implementation, the system 106 (e.g., severity index calculator 216c) calculates a severity index for each storm and validates (with validator 216e) that severity index against the textual words and/or phrases that were parsed (at 304a3) from the HTML articles/publications/reports.

These severity risk indices can be calculated in any one of a variety of different ways. At a high level, each severity index is intended to represent, or quantify, the severity, and by extension the potential for damage, of each respective ice storm or freezing rain event represented by the data obtained from CRREL.

In an exemplary implementation, the system 106 calculates a severity index for each storm or freezing rain event (collectively referred to as "storm" herein) as a function of ice thickness for the storm, and geographical area affected by the storm. Even more particularly, in one exemplary implementation, the system 106 calculates a severity index for each storm using the following formula:

$$\frac{I_i}{\hat{I}} + \frac{\sqrt{A_i}}{(\widehat{\sqrt{A}})},$$

where:

$I_i$ is an ice thickness (e.g., in inches) for the storm (that can be based on information that was parsed from the textual storm descriptions), $\hat{I}$ is an average ice thickness (e.g., in inches) for all of the storms in the database (e.g., that can be based on information that was parsed from the textual storm descriptions), $A_i$ is a spatial area of the storm (e.g., a footprint or geographical area affected by the storm, e.g. in square miles, acres, square kilometers, etc.) that may have been downloaded with or calculated from information from the CRREL GIS data, and $\widehat{\sqrt{A}}$ is an average over all the values of the square roots of the spatial areas for all the storms in the database. In the formula, the square root values are calculated first, 1 by 1 for each storm in the database, then the average of all those square root values is calculated.

There are a variety of different ways that the system 106 (at 304a4) might validate a calculated severity index against the textual words and/or phrases that were parsed from the HTML articles/publications/reports. At a high level, the system 106, in this regard, utilizes this subjective severity information from the storm description text mining to cross-check the validity of the index values for quantifying the severity of the storm. In various implementations, this validation process can identify instances of inconsistency (glaring or otherwise) between a storm's calculated severity index and the textual words and/or phrases parsed out of HTML articles/publications/reports for that storm.

In other embodiments, the results of text mining, which could yield otherwise unavailable damage reports, would themselves be included the formula for calculating severity. For instance, one embodiment may add to the severity index a factor equal to the ratio of the number of people losing electricity to the average of number of people losing electricity across the collected set of storms. Another embodiment could similarly add a factor to the index based on the ratio of social media mentions or reports to the average mentions or reports for the collected storms. Other techniques are possible as well.

According to an exemplary implementation, the system 106 performs regression testing between each severity index value and textual information that was parsed from the HTML, articles/publications/reports. For example, the system 106 may be configured to count the number of articles about a particular storm that include the word "worst," and then check to make sure that the calculated severity index is not inconsistent (or at least not glaringly so) with that count. If the system 106 in this example calculates a low severity index for a particular storm (suggesting that the storm was not very severe at all), but the parsing process identifies three different articles about the storm that include the word "worst" (e.g., as in "worst storm of the year," etc.), then the validation process might flag that particular severity index as being suspect/not necessarily reliable.

In those instances, where the validation process flags a suspect severity index, the system 106 may: 1) discard the suspect severity index, and/or 2) send a message (via email, text, push notification, website notification, etc.) to a system user that flags the severity index as suspect. The system user, then, may take steps to address and/or correct for any shortcoming or problems associated with the suspect severity index, including possibly modifying the formula used to calculate the severity index. The system 106 may be configured to provide an interface (at one or more of the computer-based user terminals) that a user can use to modify the severity index formula.

After the system 106 calculates (and, optionally, validates) the ice storm severity indices, the system 106 stores them, typically in a temporary storage medium of some form, such as RAM, for later use.

Table 2, below, shows an example of system data after the CRREL data is ingested, processed, and after the severity indices are calculated.

TABLE 2

System data after the CRREL data has been ingested, processed, and after severity indices have been calculated

| Storm ID | Date | Area | Ice Thickness (Inches) | Worst Count | Ice Storm Index |
|---|---|---|---|---|---|
| 339 | Jan. 11, 1956 | 32196 | 0.75 | 0 | 1.41 |
| 340 | Mar. 7, 1956 | 6160 |  | 0 | 1.22 |
| 346 | Dec. 6, 1958 | 4046 | 0.50 | 0 | 1.61 |
| 347 | Jan. 12, 1982 | 239005 |  | 2 | 1.70 |
| 349 | Feb. 8, 1959 | 81335 | 0.63 | 1 | 1.77 |
| 351 | Dec. 15, 1982 | 3250 | 0.50 | 0 | 1.06 |
| 352 | Dec. 11, 1959 | 22152 | 0.75 | 0 | 1.47 |
| 353 | Dec. 23, 1959 | 4682 | 0.92 | 3 | 2.30 |
| 361 | Mar. 17, 1984 | 129136 | 2.00 | 0 | 1.19 |
| 364 | Mar. 2, 1985 | 149651 | 0.42 | 0 | 2.04 |

This exemplary table includes data that relates to ten different ice storms: Storm IDs 339, 340, 346, 347, 349, 351, 352, 353, 361, and 364. The data in the table includes, for each represented storm: the unique, CRREL-assigned, identification number (in the STORM ID column), a date that corresponds to CRREL's recorded start (in the DATE column), an area of the storm (in the AREA column) that may have been downloaded from the CRREL database or calculated based on the downloaded CRREL data), an ice thickness (in the ICE THICKNESS (INCHES) column, a count of the number of articles or number of times in articles that the word "worst" appeared for each storm (in the WORST COUNT column), and the calculated ice storm index for each storm (in the ICE STORM INDEX column).

In Table 1, the storm with the lowest severity index is Storm ID No. 351, with a severity index of 1.06 and a worst count of 0. The storm with the highest severity index is Storm ID No. 353, with a severity index of 2.30 and a worst count of 3. These two exemplary table entries show a high correlation between the calculated severity indices and the textual information (worst counts) parsed from the HTML articles/publications/reports. It is also worth noting that the CRREL data for storm ID No. 346 in Table 1 had two entries, but the system 106 consolidated those two entries into just one entry in Table 2.

Next (at 304b), the process has the system 106 (e.g., the METAR/GHCN ingesting and pre-processing module 222) ingesting and pre-processing of METAR and GHCN station data.

METAR is basically a format for reporting weather information. METAR weather reports may be used by pilots and/or meteorologists to generally assist in weather forecasting. Raw METAR is a very common format in the world for the transmission of observational weather data. It is highly standardized, which allows it to be understood throughout most of the world. METARs typically come from airports or permanent weather observation stations. Reports tend to be generated according to a predefined schedule (e.g., once an hour or half-hour), but if conditions change significantly, special reports may be issued. Some METARs are created by automated weather stations, some use augmented observations, which are recorded by digital sensors, encoded via software, and then reviewed by certified weather observers or forecasters prior to being transmitted, and some use observations by trained observers or forecasters who manually observe and encode their observations prior to transmission.

The GHCN is essentially an integrated database of climate summaries from land surface stations across the globe that are been subjected to a common suite of quality assurance reviews. The database includes data collected from many continuously reporting fixed stations at the Earth's surface and represents the input of approximately 6000 temperature stations, 7500 precipitation stations, and 2000 pressure stations.

Some of the data is more than 175 years old and some of the data may be less than an hour old.

According to the illustrated implementation, ingesting and pre-processing of METAR and GHCN station data involves the system 106 pulling raw data from these sources (at 304b1), calculating daily total precipitation amounts and daily freezing precipitation amounts from the METAR data (at 304b2), filtering the GHCN data for freezing rain days and extracting daily precipitation totals (at 304b3), and mapping the data to the grid and getting a "best" estimate for daily freezing rain (at 304b4).

The pulling of data from METAR (by the METAR/GHCN collector/scraper 222a, at 304b1) typically includes downloading the data, formatting the data and storing it in computer-based memory (e.g., in a relational database). Table 3, below, shows an example of what the data in this regard would look like after it has been downloaded to the system 106, formatted by the system 106 and stored in a PostgreSQL database.

TABLE 3

METAR data as stored in a PostgreSQL database

| SensorId | Latitude | Longitude | DateTimeGmt | PrecipPrevHr_mm | PresentWeather |
|---|---|---|---|---|---|
| KPWM | 43.650002 | −70.32 | Jan. 19, 2011 1 0:51 | 0.51 | Light FZRA BR |
| KPWM | 43.650002 | −70.32 | Jan. 19, 2011 1:51 | 0.76 | Light FZRA BR |
| KPWM | 43.650002 | −70.32 | Jan. 19, 2011 2:51 | 0.76 | Light FZRA BR |
| KPWM | 43.650002 | −70.32 | Jan. 19, 2011 3:51 | 0.25 | Light FZRA BR |
| KPWM | 43.650002 | −70.32 | Jan. 19, 2011 4:51 | 0.25 | Light FZRA BR |
| KPWM | 43.650002 | −70.32 | Jan. 19, 2011 5:20 | 0 | N/A |
| KPWM | 43.650002 | −70.32 | Jan. 19, 2011 5:51 | 0 | N/A |
| KPWM | 43.650002 | −70.32 | Jan. 19, 2011 6:03 | 0 | Light FZRA |
| KPWM | 43.650002 | −70.32 | Jan. 19, 2011 6:31 | 0 | Moderate UP |
| KPWM | 43.650002 | −70.32 | Jan. 19, 2011 6:51 | 0 | N/A |
| KPWM | 43.650002 | −70.32 | Jan. 19, 2011 7:51 | 9999 | N/A |
| KPWM | 43.650002 | −70.32 | Jan. 19, 2011 8:51 | 0.25 | Light SN BR |
| KPWM | 43.650002 | −70.32 | Jan. 19, 2011 9:15 | 0.51 | Light SN BR |
| KPWM | 43.650002 | −70.32 | Jan. 19, 2011 9:33 | 0.51 | Moderate UP BR |

TABLE 3-continued

METAR data as stored in a PostgreSQL database

| SensorId | Latitude | Longitude | DateTimeGmt | PrecipPrevHr_mm | PresentWeather |
|---|---|---|---|---|---|
| KPWM | 43.650002 | −70.32 | Jan. 19, 2011 9:51 | 0.51 | Light RA BR |
| KPWM | 43.650002 | −70.32 | Jan. 19, 2011 10:51 | 0 | Light RA BR |
| KPWM | 43.650002 | −70.32 | Jan. 19, 2011 11:51 | 0.25 | Light RA |
| KPWM | 43.650002 | −70.32 | Jan. 19, 2011 12:51 | 0.25 | Light RA |
| KPWM | 43.650002 | −70.32 | Jan. 19, 2011 13:51 | 0 | N/A |
| KPWM | 43.650002 | −70.32 | Jan. 19, 2011 14:51 | 9999 | N/A |
| KPWM | 43.650002 | −70.32 | Jan. 19, 2011 15:51 | 9999 | N/A |
| KPWM | 43.650002 | −70.32 | Jan. 19, 2011 16:51 | 9999 | Moderate BR |
| KPWM | 43.650002 | −70.32 | Jan. 19, 2011 17:51 | 0.51 | Light RA |
| KPWM | 43.650002 | −70.32 | Jan. 19, 2011 18:51 | 0.51 | Light RA |
| KPWM | 43.650002 | −70.32 | Jan. 19, 2011 19:51 | 0.76 | Light SN BR |
| KPWM | 43.650002 | −70.32 | Jan. 19, 2011 20:51 | 0.51 | Light SN BR |
| KPWM | 43.650002 | −70.32 | Jan. 19, 2011 21:51 | 0.51 | Light SN BR |
| KPWM | 43.650002 | −70.32 | Jan. 19, 2011 22:19 | 0 | Light SN BR |
| KPWM | 43.650002 | −70.32 | Jan. 19, 2011 22:51 | 0 | Light SN BR |
| KPWM | 43.650002 | −70.32 | Jan. 19, 2011 23:46 | 0.25 | Light SN BR |
| KPWM | 43.650002 | −70.32 | Jan. 19, 2011 23:51 | 0.25 | Light SN BR |

This exemplary table includes precipitation and weather data over the course of a day collected periodically (e.g., hourly and then a few other readings) at a particular sensor location. The data in the table includes, for each time entry: a sensor identifier (in the SENSORID column), geolocation data for the sensor (in the LATITUDE and LONGITUDE columns), date and time information, in Greenwich Mean Time (in the DATETIMEGMT column), previous hour precipitation amounts, in millimeters (in the PRECIPPRE-VHR_MM column), and information about then-current weather conditions (in the PRESENTWEATHER column).

The sensor ID, in the illustrated example, is KPWM, which is an International Civil Aviation Organization (ICAO) designator that refers to a weather sensor at the Portland International Jetport in Cumberland Me., United States. The abbreviations in the PRESENTWEATHER column are as follows: FZ=Freezing, RA=Rain, BR=Mist, UP=Unknown Precipitation, and SN=Snow.

The pulling of data from GHCN (at 304b1) may involve the system 106 downloading the data, formatting the data and storing it in computer-based memory (e.g., in a relational database or any other type of computer-based memory).

Table 4, below, shows an exemplary collection of raw GHCN data that the system 106 may have downloaded.

TABLE 4

Raw GHCN Data

USW00014745201101TMAX 106 X 61 X 17 X 11 X 11 X −11 X −22 X −11 X 11 X −
11 X −11 X −22 X −22 X −61 X −44 X −11 X −89 X 0 X 22 X −22 X −28 X −50 X −78
X −144 X −83 X −28 X −6 X 11 X 11 X −17 X −72 X
USW00014745201101TMIN −39 X 6 X −94 X −128 X −122 X −150 X −150 X −56 X −56 X −
78 X −150 X −56 X −111 X −156 X −233 X −117 X −206 X −183 X −33 X −89 X −117 X −217
X −206 X −239 X −200 X −211 X −139 X −172 X −100 X −172 X −178 X
USW00014745201101PRCP 0T X 10 X 0 X 0 X 0T X 0 X 0T X 3 X 0 X 0 X
0 X 328 Z 0 X 0 X 3 X 0 X 0 X 231 X 66 X 0T X 81 X 0 X 0T X 0 X
13 X 10 X 48 X 0T X 5 Z 0 X 0 X
USW00014745201101SNOW 0 X 0 X 0 X 0 X 0T X 0 X 0T X 13 Z 0 X 0 X
0 X 465 X 0 X 0 X 18 X 0 X 0 X 175 X 36 Z 0T X 122 X 0 X 0T X 0 X
43 Z 10 Z 46 Z 0T X 20 X 0 X 0 X
USW00014745201101SNWD 127 Z 76 Z 51 Z 51 Z 51 Z 51 Z 51 Z 51 Z 51 Z 51
Z 51 Z 178 Z 483 Z 432 Z 406 Z 381 Z 356 Z 330 Z 432 Z 432 Z 533 Z 508 Z 508
Z 483 Z 559 Z 559 X 559 Z 533 Z 533 Z 533 Z 508 Z
USW00014745201101AWND 0 W 10 W 55 W 1 W 24 W 5 W 17 W 24 W 61 W
69 W 8 W 63 W 55 W 24 W 13 W 35 W 18 W 21 W 25 W 22 W 33 W 10 W
36 W 38 W 3 W 12 W 39 W 4 W 2 W 13 W 34 W
USW00014745201101FMTM 2208 X 2345 X 0428 X 1344 X 1805 X 1114 X 1432 X 2107 X
1307 X 1306 X 0041 X 0608 X 1323 X 1635 X 1643 X 1329 X 1147 X2323 X 1856 X 1356
X 1531 X 1241 X 2127 X 0307 X 0846 X 2004 X 1200 X 1605 X 1507 X 1809 X 1126 X
USW00014745201101PGTM 1939 W 2351 W 0427 W 1408 W 1804 W 1850 W 1446 W 2246
W 1347 W 0406 W 0007 W 0623 W 1146 W 1634 W 1637 W 1024 W 1146 W 2101 W 1855
W 1416 W 1525 W 1147 W2126 W 0223 W 1254 W 1934 W 1225 W 1536 W 1507 W 1808
W 1108 W
USW00014745201101WDF2 260 X 300 X 320 X 160 X 300 X 330 X 80 X 330 X 320 X
310 X 320 X 320 Z 300 X 320 X 160 X 300 X 310 X 310 X 320 X 300 X 300 X 330
X 320 X 310 X 310 X 30 X 320 X 180 X 300 X 300 X 310 X
USW00014745201101WDF5 60 X 300 X 310 X 30 X 290 X 20 X 50 X 320 X 330 X
290 X 320 X 340 Z 300 X 320 X 180 X 300 X 310 X 30 X 310 X 280 X 290 X 320
X 320 X 300 X 320 X 40 X 320 X 170 X 300 X 300 X 300 X
USW00014745201101WSF2 22 X 89 X 130 X 22 X 89 X 45 X 45 X 54 X 103 X
107 X 58 X 98 Z 107 X 58 X 63 X 89 X 63 X 54 X 58 X 72 X 112 X 67 X 103
X 80 X 27 X 58 X 125 X 45 X 54 X 67 X 76 X
USW00014745201101WSF5 27 X 130 X 183 X 31 X 112 X 94 X 58 X 63 X 139 X

TABLE 4-continued

Raw GHCN Data

148 X 76 X 134 Z 143 X 80 X 80 X 116 X 76 X 67 X 72 X 89 X 156 X 89 X
130 X 116 X 27 X 72 X 148 X 63 X 58 X 94 X 107 X
USW00014745201101WT01 1 W 1 X-9999 -9999 1 W-9999 -9999 1 W-9999 -
9999 -9999 1 W-9999 -9999 1 W 1 W-9999 1 W 1 W 1 W 1 W-9999 1
W-9999 1 W 1 W 1 W 1 W 1 W-9999
USW00014745201101WT02-9999 1 X-9999 -9999 -9999 -9999 -9999 -9999 -9999 -
9999 -9999 1 X-9999 -9999 -9999 -9999 -9999 1 X-9999 -9999 1 X-9999 -
9999 -9999 -9999 -9999 -9999 -9999 1 X 1 X-9999
USW00014745201101WT08 1 X-9999 -9999 -9999 1 W-9999 -9999 1 W-9999 -
9999 -9999 1 X-9999 -9999 -9999 -9999 -9999 -9999 -9999 1 X 1 W-9999 1
W-9999 1 X 1 X 1 W 1 X 1 X-9999 -9999
USW00014745201101WT09-9999 -9999 -9999 -9999 -9999 -9999 -9999 -9999 -9999 -
9999 -9999 -9999 -9999 -9999 -9999 -9999 -9999 -9999 -9999 -9999 1 X-9999 -
9999 -9999 -9999 -9999 -9999 -9999 -9999 -9999 -9999
USW00014745201101WT13 1 X 1 X-9999 -9999 1 X-9999 -9999 -9999 -9999 -9999
-9999 -9999 -9999 -9999 1 X-9999 -9999 -9999 1 X-9999 -9999 -9999 1 X-
9999 1 X 1 X 1 X 1 X-9999 1 X-9999
USW00014745201101WT16 1 X 1 X-9999 -9999 -9999 -9999 -9999 -9999 -9999 -
9999 -9999 -9999 -9999 -9999 -9999 -9999 -9999 1 X 1 X-9999 -9999 -9999 -
9999 -9999 -9999 -9999 -9999 -9999 -9999 -9999 -9999
USW00014745201101WT17-9999 -9999 -9999 -9999 -9999 -9999 -9999 -9999 -9999 -
9999 -9999 -9999 -9999 -9999 -9999 -9999 -9999 1 X-9999 -9999 -9999 -9999 -
9999 -9999 -9999 -9999 -9999 -9999 -9999 -9999 -9999
USW00014745201101WT18-9999 -9999 -9999 -9999 1 X-9999 1 X 1 X-9999 -9999 -9999
1 X-9999 -9999 1 X-9999 -9999 1 X 1 X 1 X 1 X-9999 1 X-9999
1 X 1 X 1 X 1 X 1 X-9999 -9999
USW00014745201101WT19-9999 -9999 -9999 -9999 -9999 -9999 -9999 -9999 -9999 -
9999 -9999 -9999 -9999 -9999 -9999 -9999 -9999 -9999 1 X-9999 -9999 -9999 -
9999 -9999 -9999 -9999 1 X-9999 -9999 -9999 -9999
USW00014745201101WT22-9999 -9999 -9999 -9999 -9999 -9999 -9999 -9999 -9999 -
9999 -9999 1 X-9999 -9999 -9999 -9999 -9999 -9999 -9999 -9999 1 X-9999 -
9999 -9999 -9999 -9999 1 X-9999 1 X 1 X-9999

The foregoing data set, in Table 4, includes daily (not hourly) cumulative weather data. In each box, which corresponds to one line of data in the original files, there is a weather station identifier (e.g., USW00014745201101) that identifies the weather station, from which the data in that box originated, followed by encoded data for one month of weather history. After the weather station identifier, in each box, there is a code that indicates the kind of data represented in that box. A few examples include T MAX (which refers to the maximum temperature for that day), T MIN (which refers to the minimum temperature for that day), PRCP (which refers to total precipitation for that day), SNOW (which refers to total snow fall for that day), SNWD (which refers to snow depth accumulated on that day), WT01 (which refers to fog, ice fog, or freezing fog), WT02 (which refers to heavy fog or heaving freezing fog), WT13 (which refers to mist), WT16 (which refers to rain, which may include freezing rain, drizzle, and freezing drizzle), WT17 (which refers to freezing rain), WT18 (which refers to snow, snow pellets, snow grains, or ice crystals), WT19 (which refers to an unknown source of precipitation), WT22 (which refers to ice fog or freezing fog), etc. Other GHCN abbreviations (in the table above and otherwise) are available online.

In a typical implementation, the data from Table 4, above, can be deciphered (either by the system 106 or by a user of the system) and the relevant cumulative daily data may be stored (e.g., in a computer-based memory in the system 106) for later use.

Next (at 304b2), in FIG. 3, the system 106 (e.g., METAR precipitation calculator 222b) calculates daily total precipitation and daily total freezing precipitation from the collected METAR data.

There are a variety of ways to calculate (at 304b2) daily total precipitation from the collected METAR data. According to an exemplary implementation, the system 106 searches the METAR data that has been stored in the relational database for any hourly METAR data entries that indicate (e.g., by the presence of a non-zero entry in the PRECIPPREVHR_MM column of Table 3, and/or by a corresponding one of the ICAO designators indicating the presence of precipitation in the previous hour) that precipitation has occurred in the previous hour. The system 106 then simply adds up the indicated precipitation amounts. In some implementations, any non-hourly data entries (e.g., 1/19/11, 9:150.51 in Table 3) might be discarded, or otherwise accounted for to not double count any precipitation, during this calculation process.

There are a variety of ways to calculate (at 304b2) daily total freezing precipitation from the collected METAR data. According to an exemplary implementation, the system 106 may perform a text search of the METAR data in the relational database to identify data entries with ICAO designators that indicate the occurrence of freezing rain (e.g., FZRA), and then add up the corresponding precipitation values from the PRECIPPREVHR_MM column (see Table 3).

After calculating the daily total precipitation and daily total freezing precipitation values, the system 106 may store those values in a computer-based memory. The system 106 may also divide the daily total freezing precipitation values by the daily total precipitation values to get the fraction of the daily total precipitation that was freezing and store these fraction values in a computer-based memory.

Next (at 304b3), the system 106 (e.g., GHCN filter and extractor 222c) filters the GHCN data stored in the computer-based memory to identify any days that have freezing rain entries, and, for each of those days, extracts the daily cumulative precipitation amount.

Thus, according to this exemplary implementation, the system 106 acquires, and stores, hourly precipitation/freezing rain data from one source (METAR), and daily cumulative precipitation data from a different source (GHCN).

Next (at 304b4), the system 106 (e.g., map-to-grid/best estimate calculator 222d) maps the METAR/GHCN data to the grid and calculates a best estimate for daily freezing rain amounts based on the METAR/GHCN data.

There are a variety of ways that the system 106 might calculate its best estimate for daily freezing rain amounts (at a particular location) based on the METAR and/or GHCN data. In an exemplary implementation, the system 106 has the capability to decide which data from two overlapping datasets for total accumulated precipitation to utilize based on data quality, or when to combine the data, e.g., when complementary. The methodology for choosing one data set over another or whether to combine data sets can be accomplished in numerous ways.

In an exemplary embodiment, it may be done in a hierarchical fashion. In this example, the GHCN and METAR data are mapped to grid cells by matching each grid cell with any GHCN or METAR station located within a certain distance (e.g., 75 km) of the grid cell centroid. For any grid cell with both GHCN and METAR data available, a best estimate of daily freezing rain totals may be calculated using hierarchical rules to combine the two datasets. In those instances, where available, GHCN daily total precipitation values (which tend to be more accurate for full day estimates) may be used, but those values may be prorated by the proportion of the corresponding METAR precipitation that is freezing precipitation. This approach leverages the higher quality total precipitation amounts from the GHCN data with the more temporally precise differentiation of type of precipitation from the METAR observations.

In some implementations, the system 106 has fallback processes when an expected, or potentially useful, data source might be missing. In this exemplary implementation, rules are defined (and stored by the system 106 in computer-based memory) to handle instances where one of the data types is not available. When METAR data alone is available (but not corresponding GHCN data), the METAR daily freezing rain accumulations are used as-is. When GHCN data alone is available (but not corresponding METAR data), the daily total precipitation values are used, but only on days flagged as containing freezing precipitation, and the values may be prorated by the average proportion of freezing precipitation to total precipitation from all the METAR data, for example. The results of this processing may be stored, for example, in a temporary computer-based memory or storage medium for later use in subsequent calculations.

Table 5, below, shows an example of the type of data that might result from the ingesting and pre-processing of METAR and GHCN station data (at 304b) as described above.

GRID ID 2285082491). This grid cell, obviously, would correspond to a particular geographical region. The data includes the cell identifier (in the GRID ID column), the date of the corresponding event (in the DATE column), the precipitation amount for that day as reflected in the GHCN data (in the GHCN PRECIP (CM) column), a flag (1 or 0) to indicate whether the GHCN-based precipitation data in the previous column was freezing precipitation (1) or not (0) (in the GHCN FRZ FLAG column), the daily precipitation amount based on the METAR data (in the METAR PRECIP (CM) column), a fraction of the previous column's precipitation amount that was freezing precipitation (in the METAR FRZ FRACTION column), and the system's 100 best estimate of freezing precipitation at the corresponding geographical location for the day based on the METAR and GHCN data.

In the illustrated implementation, the grid cell is the grid cell that corresponds to GRID ID 2285082491, the date of the corresponding event is Jan. 19, 2011, the precipitation amount for that day as reflected in the GHCN data is 0.46 cm, the GHCN freezing precipitation flag indicates that at least some of the GHCN precipitation was freezing, the precipitation amount for that day as reflected by the METAR data is 0.81 cm, the fraction of the day the METAR precipitation was freezing is 0.26, and the system's 100 best estimate of freezing precipitation at the corresponding geographical location for the day based on the METAR and GHCN data is 0.12 cm. In this example, the system 106 may have calculated this best estimate by multiplying the precipitation amount for that day as reflected by the METAR data (0.81 cm) by the fraction of the day the METAR precipitation was freezing (0.26). In this regard 0.81× 0.26=0.12.

The system, in a typical implementation, performs these types of calculations for each cell in the grid and stores the resulting data in a computer-based memory.

Next, the system 106 (at 306) takes into account, for each respective one of the grid cells, the probability that a storm will occur in the geographical region that corresponds to the grid cell. Consideration in this regard is given to both the data associated with METAR and GHCN (in 306a), as well as the data associated with CRREL (at 306b).

More particularly, the system 106 (e.g., the METAR/GHCN probability estimator 224, at 306a) pays consideration to the data associated with METAR and/or GHCN in accounting for the probability (or likelihood) that a storm (of a particular severity level) will occur in each geographical region that corresponds to one of the grid cells by: counting (with the METAR/GHCN historical occurrence counter 224a, at 306a1) the historical occurrences (represented in the METAR and/or GHCN data) of storms (having particular severity levels) that affected the geographic region associated with each respective grid cell, calculating (with the METAR/GHCN probability calculator 224b, at 306a2) an

TABLE 5

| | | Combined Processed METAR and GHCN data | | | | |
|---|---|---|---|---|---|---|
| Grid ID | Date | GHCN Precip (cm) | GHCN Frz Flag | METAR Precip (cm) | METAR Frz Fraction | Frz Precip (cm) |
| 2285082491 | Jan. 19, 2011 | 0.46 | 1 | 0.81 | 0.26 | 0.12 |

This exemplary table includes data that relates to one particular cell in the grid (i.e., the cell that corresponds to annual probability, for each cell, of a storm (with the corresponding severity level) affecting the corresponding geographical region based on the historical occurrences, and calculating (with the METAR/GHCN severity-weighted index calculator 226, at 306a3) severity-weighted indices for each respective grid cell based, at least in part, on the calculated probability of a storm affecting the corresponding geographical region based on the counted historical occurrences.

Likewise, the system 106 (e.g., the CRREL probability estimator 218, at 306b) pays consideration to the data associated with CRREL in accounting for the probability (or likelihood) that a storm (with a particular severity level) will occur in each geographical region that corresponds to one of the grid cells by: aligning the data with the grid cells and counting (with the CRREL historical occurrence counter 218a, at 306b1) the historical occurrences (represented in the CRREL data) of storms (with that severity level) that affected the geographic region associated with each respective grid cell, calculating (with the CRREL probability calculator 218b, at 306b2) an annual probability, for each cell, of a storm (with that severity level) affecting the corresponding geographical region based on the historical occurrences, and calculating (with the CRREL severity-weighted index calculator 220, at 306b3) severity-weighted indices for each respective grid cell based, at least in part, on the calculated probability of a storm affecting the corresponding geographical region based on the counted historical occurrences.

These steps can be performed in a number of different ways. According to one such example, the system 106 calculates probabilities of ice storms and freezing rain events at various severity levels and by location (e.g., on a grid-by-grid basis).

In this example, for each grid cell, all the ice storms from the CRREL dataset that occurred over a period of time (e.g., between 1950 and 2015) and that spatially impact that cell are collected. The system 106 then categorizes the ice storms based on the severity indices previously calculated for each storm (see, e.g., 304a4 in FIG. 3). As an example, the ice storms may be categorized using the following categories for severity index ranges of: 1.5-3.5, 3.5-4.5, 4.5-5.5, 5.5+. Other embodiments could use other categories depending on the indices calculated.

Next, in this exemplary process, the system 106 collects, for each grid cell, all of the freezing rain events from the pre-processed METAR and GHCN ground-station data. These freezing rain events are also categorized (e.g., by daily accumulated freezing rain totals, see, e.g., 304b4). As an example, the categories may be based on daily accumulated freezing rain total ranges of: 0.75-1.0", 1.0-1.5", 1.5-2.0", 2.0+".

After categorization, the system 106 calculates the probability of ice storm and freezing rain events at a particular severity level by counting the number of events over a time period in that severity level, which typically corresponds with the amount of available data (though it can be configured otherwise), and fitting a uniform probability distribution. Thus, if the system 106 counts fifty storms (of a particular severity level) that have affected a particular geographical region over the course of one hundred years, then the system 106 might calculate an annual probability of a storm (with that severity) affecting that geographical region to be 50% (i.e., 50 occurrences/100 years×100=50). Although the system may be configured to assume that a uniform distribution of storms per year should apply in calculating the probability (or likelihood) of a storm occurring in a particular year and at a particular location, in some implementations, other probability distributions, such as the Poisson distribution, may apply.

In some implementations, after calculating the raw weather peril probabilities (at 306a2 and 306b2), the system 106 calculates (at (306a3 and 306b3) severity-weighted risk indices, by weighting the probability of more severe events more heavily than the probably of less severe events. In an exemplary implementation, the severity-weighted risk indices may be defined as follows: $r=p_1+2*p_2+3*p_3+4*p_4$, where r is a severity-weighted risk index, and $p_i$ is the probability for a severity category, in increasing order of severity. In an exemplary embodiment, the risk indices are calculated independently from the CRREL ice storm probabilities and the ground station freezing rain probabilities. The results of such calculations are illustrated in Table 6 and Table 7, below.

TABLE 6

CRREL-derived Risk Index Calculation

| Grid ID | Counts | Prob_c1 | Prob_c2 | Prob_c3 | Prob_c4 | Risk Index |
|---|---|---|---|---|---|---|
| 2286888192 | 3 | 0.031 | 0.000 | 0.015 | 0.000 | 0.077 |
| 2286910489 | 2 | 0.015 | 0.000 | 0.015 | 0.000 | 0.062 |
| 2286924415 | 0 | 0.000 | 0.000 | 0.000 | 0.000 | 0.000 |
| 2286924419 | 6 | 0.077 | 0.015 | 0.000 | 0.000 | 0.108 |
| 2286975572 | 0 | 0.000 | 0.000 | 0.000 | 0.000 | 0.000 |
| 2286975576 | 12 | 0.169 | 0.015 | 0.000 | 0.000 | 0.200 |
| 2286981621 | 0 | 0.000 | 0.000 | 0.000 | 0.000 | 0.000 |
| 2286981636 | 1 | 0.000 | 0.000 | 0.015 | 0.000 | 0.046 |
| 2286992376 | 2 | 0.031 | 0.000 | 0.000 | 0.000 | 0.031 |
| 2286992344 | 0 | 0.000 | 0.000 | 0.000 | 0.000 | 0.000 |

TABLE 7

Combined Ground Station Derived Risk Index

| Grid ID | Counts | Prob_c1 | Prob_c2 | Prob_c3 | Prob_c4 | Risk Index | Station Hist (wks) |
|---|---|---|---|---|---|---|---|
| 2286888192 | 1 | 0.033 | 0.000 | 0.000 | 0.000 | 0.033 | 10600 |
| 2286910489 | 0 | 0.000 | 0.000 | 0.000 | 0.000 | 0.000 | 10600 |
| 2286924415 | 4 | 0.067 | 0.067 | 0.000 | 0.000 | 0.200 | 10611 |
| 2286924419 | 23 | 0.467 | 0.233 | 0.000 | 0.033 | 1.067 | 10628 |

TABLE 7-continued

Combined Ground Station Derived Risk Index

| Grid ID | Counts | Prob_c1 | Prob_c2 | Prob_c3 | Prob_c4 | Risk Index | Station Hist (wks) |
|---|---|---|---|---|---|---|---|
| 2286975572 | 4 | 0.067 | 0.067 | 0.000 | 0.000 | 0.200 | 10611 |
| 2286975576 | 23 | 0.467 | 0.233 | 0.000 | 0.033 | 1.067 | 10628 |
| 2286981621 | | | | | | | |
| 2286981636 | | | | | | | |
| 2286992376 | 1 | 0.000 | 0.000 | 0.000 | 0.033 | 0.133 | 10636 |
| 2286992344 | | | | | | | |

The information in Table 6 includes cell identifiers (in the GRID ID column), a count of the historical occurrences (in the CRREL data) of a storm affecting the corresponding geographical region (in the COUNTS column), a probability of a storm in a first (or lowest) severity category occurring in the corresponding geographical region (in the PROB_C1 column), a probability of a storm in a second (slightly higher) severity category occurring in the corresponding geographical region (in the PROB_C2 column), a probability of a storm in a third (even higher) severity category occurring in the corresponding geographical region (in the PROB_C3 column), a probability of a storm in a fourth (higher still) severity category occurring in the corresponding geographical region (in the PROB_C4 column), and the associated severity-weighted risk index for that grid cell (defined by the: $r=p_1+2*p_2+3*p_3+4*p_4$ equation).

Grid cell 2286888192 in Table 6 has a severity-weighted risk index of 0.77 (based on CRREL data), which the system 106 calculates by using the following approach (based on the foregoing equation): $r=0.033+0.015*3=0.077$.

The information in Table 7 includes cell identifiers (in the GRID ID column), a count of the historical occurrences (in the METAR and GHCN data) of a storm affecting the corresponding geographical region (in the COUNTS column), a probability of a storm in a first (or lowest) severity category occurring in the corresponding geographical region (in the PROB_C1 column), a probability of a storm in a second (slightly higher) severity category occurring in the corresponding geographical region (in the PROB_C2 column), a probability of a storm in a third (even higher) severity category occurring in the corresponding geographical region (in the PROB_C3 column), a probability of a storm in a fourth (higher still) severity category occurring in the corresponding geographical region (in the PROB_C4 column), an associated severity-weighted risk index for that grid cell (defined by the: $r=p_1+2*p_2+3*p_3+4*p_4$ equation), and a count of the number of weeks of station history that apply.

Grid cell 2286888192 in Table 7 has a severity-weighted risk index of 0.033, which the system 106 calculates by using the following approach (based on the foregoing equation): $r=0.033$.

The system 106 typically stores the severity-based risk indices (and, in some implementations, the other information in Tables 6 and 7) in temporary storage for later processing.

Next (at 308), in the illustrated implementation, the system 106 (e.g., the blender 228) blends the two estimated severity-weighted indices for each grid cell.

This blending (at 308) can be performed in a number of ways. In one example, the system 106 retrieves all available risk indices from temporary storage and then blends them by weighted averaging (e.g., at 308a, 308b). In this regard, the system 106 may adjust the weights to account for the quality of each respective data source. Data quality may be assessed internally by the system 106 or the system 106 may ingest and rely upon external quality assessments (e.g., as provided by a human or some other computer-based quality assessment system). In one exemplary embodiment, the system 106 weights the METAR and/or GHCN ground station data more for stations that have longer and more complete (e.g., gap-free) temporal records, because the probability distribution fitting tends to be more accurate with more complete data sets. The CRREL ice storm data in this regard are weighted uniformly. When blending the ground station and CRREL data together, the CRREL data may be weighted equally to the highest quality ground station, because the CRREL dataset typically undergoes significant manual quality control in its creation.

Table 8, below, illustrates an exemplary outcome of the blending of the two severity-risk indices (from Table 6 and 7, above).

TABLE 8

Blending of CRREL and Ground Station Risk Indices

| Grid ID | Prob_c1 | Prob_c2 | Prob_c3 | Prob_c4 | Risk Index |
|---|---|---|---|---|---|
| 2286888192 | 0.032 | 0.000 | 0.006 | 0.000 | 0.051 |
| 2286910489 | 0.006 | 0.000 | 0.006 | 0.000 | 0.024 |
| 2286924415 | 0.040 | 0.040 | 0.000 | 0.000 | 0.120 |
| 2286924419 | 0.312 | 0.147 | 0.000 | 0.020 | 0.645 |
| 2286975572 | 0.040 | 0.040 | 0.000 | 0.000 | 0.120 |
| 2286975576 | 0.348 | 0.147 | 0.000 | 0.020 | 0.682 |
| 2286981621 | 0.000 | 0.000 | 0.000 | 0.000 | 0.000 |
| 2286981636 | 0.000 | 0.000 | 0.015 | 0.000 | 0.046 |
| 2286992376 | 0.012 | 0.000 | 0.000 | 0.020 | 0.093 |
| 2286992344 | 0.000 | 0.000 | 0.000 | 0.000 | 0.000 |

The data in Table 8 includes cell identifiers (in the GRID ID column, a weighted and blended probability of a storm in a first (or lowest) severity category occurring in the corresponding geographical region (in the PROB_C1 column), a weighted and blended probability of a storm in a second (slightly higher) severity category occurring in the corresponding geographical region (in the PROB_C2 column), a weighted and blended probability of a storm in a third (even higher) severity category occurring in the corresponding geographical region (in the PROB_C3 column), a weighted and blended probability of a storm in a fourth (higher still) severity category occurring in the corresponding geographical region (in the PROB_C4 column), and the weighted and blended severity-weighted risk index for that grid cell. The blended severity-weighted risk index values are calculated by weighting and blending the risk index values calculated from the CRREL and ground station probabilities (e.g., not by reapplying the risk index formula to the weighted and blended probability values).

Grid cell 2286888192 in Table 8 has a severity-weighted risk index of 0.051, which the system 106 calculates by a weighted average of the risk index values for grid cell 2286888192 from Tables 6 and 7 (0.077 and 0.033 respectively).

Next (at 310), the system 106 (e.g., spatial smoother 230) applies a spatial smoothing process to the blended severity-weighted risk indices across the grid.

This spatial smoothing can be performed in a number of different ways. In one exemplary implementation, the system 106 applies spatial smoothing by re-calculating the risk value (i.e., the severity-weighted risk index) for a given grid cell as a statistical average of the risk value for that cell and the risk values of all of the grid cells within a certain distance (or in contact with) of the given cell. This smoothing process tends to reduce spatial differentiation of risk indices across short geographical distances, where geophysical sources of different risk levels are not expected to exist from a meteorological perspective.

The distance scale of the smoothing can be tuned separately in the latitudinal direction and in the longitudinal direction. Due to the relatively small sample size of ice storms, and their shapes in the CRREL dataset, the unsmoothed risk maps may have features that are artificially elongated in the longitudinal direction and narrow in the latitudinal direction. This can be corrected for by applying a longer smoothing scale in the latitudinal direction than in the longitudinal direction. For example, as indicated in FIG. 3 (at 310*a*), the smoothing scale may be up to 30% (e.g., 10%-30%) longer in the north-south direction than in the east-west direction. In one exemplary embodiment, the latitudinal smoothing scale is 260 km while the longitudinal scale is 200 km. The system 106, in these implementations, smooths severity-related probability results and varies the smoothing scale dependent on direction.

In a typical implementation, the system 106 stores the smoothed, severity-weighted indices in a computer-based memory (e.g., in a relational database).

Next (at 312), after smoothing, the system 106 (e.g., binner 231) categorizes each risk index into a risk zone. This categorization can be performed in a number of different ways. According to one exemplary implementation, once smoothed, severity-weighted risk indices are calculated for all the cells in a given geographic area, the system 106 retrieves the indices from the relational database on which they are stored. The system 106 then groups or bins the indices to provide a relative ranking of risk for the various cells. Binning may be accomplished in a variety of different ways. In one exemplary embodiment, the system 106 groups the indices into bins numbered 1 through 10, though in other embodiments, indices could be group into smaller or larger numbers of bins and/or use other descriptors for the bins, such as color codes. In this embodiment, data is binned such that an equal amount of data is grouped into each bin. In other embodiments, the risk indices could be grouped based on differences from a mean risk index or by equal intervals between the lowest and highest valued risk indices. Other types of binning or categorization are possible as well.

In a typical implementation, the system 106 stores the scores of each cell (that represents the categorization of that cell) in a relational database for later extraction and/or analysis and/or distribution to end users.

In a typical implementation, the system 106 is able to output data (via data distribution/output module 232) to a system user at any one or more of the network's 100 computer-based user terminals 114. This output data can be configured in any one of a variety of different ways to provide convenience to the user.

Figure 4:
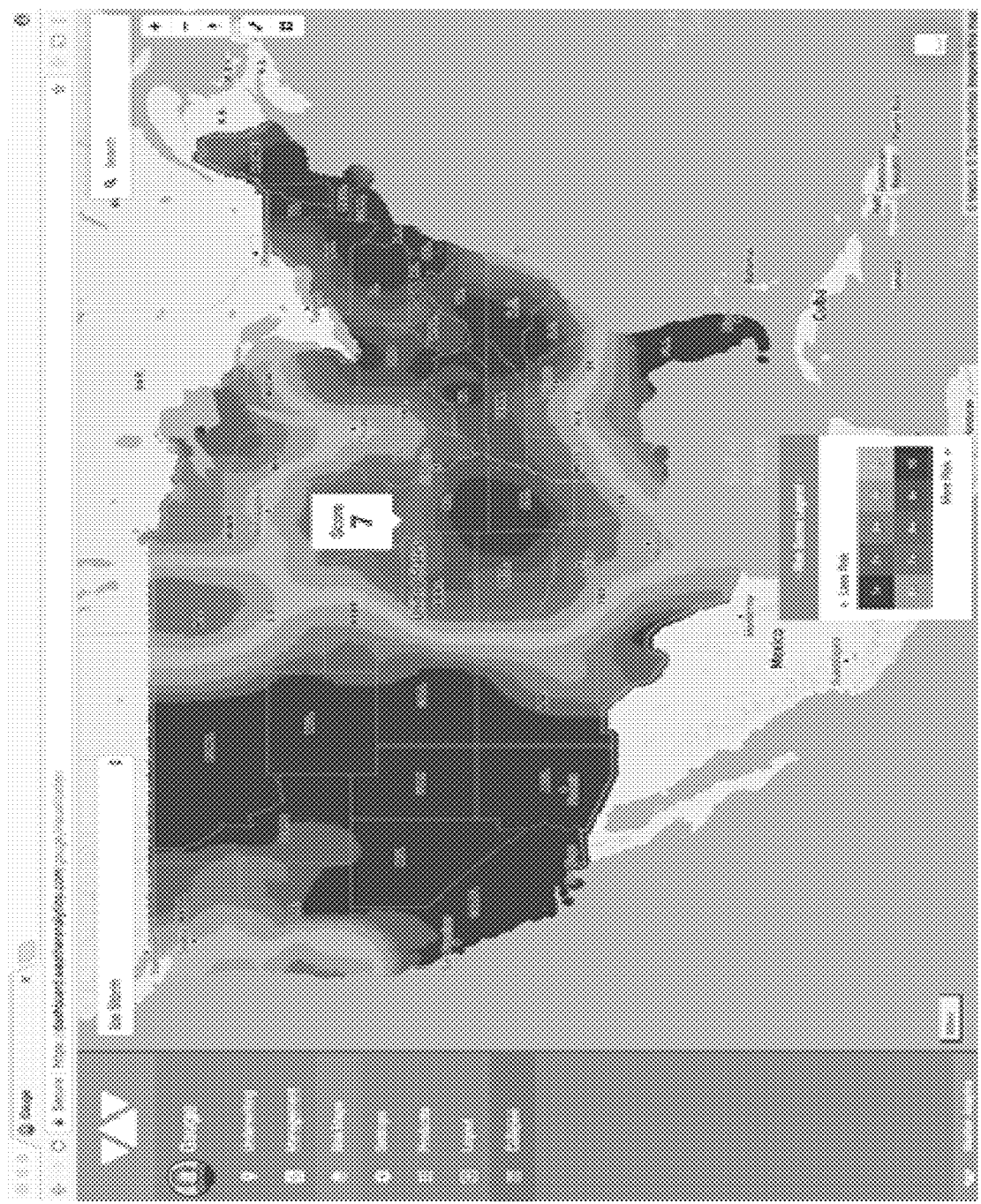
FIG. 4 shows an exemplary screenshot that the system might produce or make available at one or more of the network's computer-based user terminals.

FIG. 4 shows an exemplary screenshot that the system 106 might produce or provide access to at one or more of the network's 100 computer-based user terminals 114.

The illustrated screenshot shows a map of the contiguous United States color-coded to show the various risk categories that each geographical region represented in the map falls within. There is a risk score legend that explains the color-coding scheme near the bottom of the screenshot.

In some implementations, if a user hovers a cursor over some region on the geographical map on the screen, the system's risk score for that region will appear. In the illustrated example, the cursor is hovering over the "score 7" message.

In some implementations, double clicking on some region of the map will cause the display to zoom in on the double clicked region and may also provide additional information/insight about the associated risk score, region and underlying data.

Figure 5:
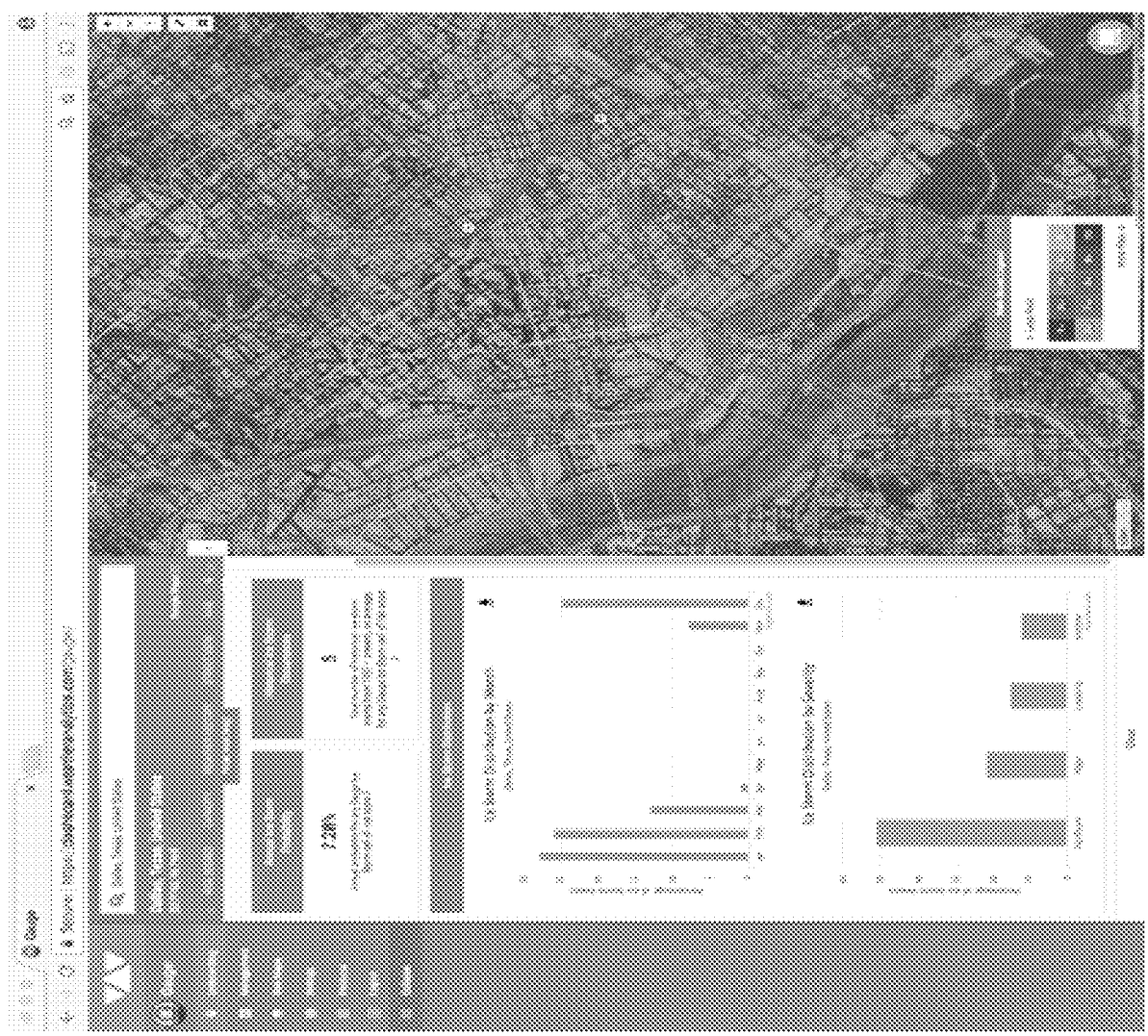
FIG. 5 shows another exemplary screenshot that the system might produce or make available at one or more of the network's computer-based user terminals.

FIG. 5 shows another exemplary screenshot that the system 106 might produce or provide access to at one or more of the network's 100 computer-based user terminals 114.

The screenshot in FIG. 5 shows a zoomed in aerial view map of a particular geographical area of the United States (part of Dallas, Tex. to be precise). The aerial view map is color coded based on risk score, and there is a risk score legend to explain the color coding on the map.

The screenshot identifies an annual ice storm probability (7.28%) that the system 106 calculated for a grid cell corresponding to the geographical region shown in the screenshot. The screenshot also identifies a count of historical ice storm occurrences (5) that affected the grid cell/geographical region, as determined by the system 106. The screenshot also shows a bar graph indicating the distribution of historical ice storm activity for the grid cell/geographical region by month, as determined and produced by the system 106. The screenshot shows a second graph indicating the distribution of historical ice storm activity for the grid cell/geographical region by severity, as determined and produced by the system 106.

A number of embodiments of the invention have been described. Nevertheless, it will be understood that various modifications may be made without departing from the spirit and scope of the invention.

For example, the various modules or components (e.g., of system 106) disclosed herein can be implemented as virtually any kind of computer-based modules and/or components (e.g., implemented in hardware, or in hardware executing appropriate software).

Data from sources outside the system 106 can be received and processed (or preprocessed) in any number of a variety of different ways. The specific risk calculations can be modified as well. The probability calculations also can be modified. The mapping and grid generation can be modified. The blending process and spatial smoothing can be modified. The data output can be modified.

Generally speaking, in the implementations disclosed herein, after grid creation, the system 106 collects and processes data sets to create risk scores. The data sets may vary by the embodiment, but generally involve some numerical measure of severity, whether measured by ice accretion, accumulation of freezing rain, wind, or a combination of these, as well as subjective, qualitative, human descriptors of the storm. The collection, and data formatting, methods may vary depending on the types and/or sources of data that will be ingested. Data sets may be stored locally or remotely. Collection from remote data storage may be made in one of many ways, including through any manner of electronic connection, such as the Internet, or a dedicated data connection. Collection may be made at different times and in different manners. In a simple embodiment, a human-directed ad hoc collection process could manually collect selected data through electronic communication devices or systems, such as the Internet. In another embodiment, collection could take place at pre-determined time intervals (configured, e.g., to coincide with expected data releases or to take place when likelihood of data congestion in the connection is remote). In other embodiments, collection could take place once the system 106 receives an indication that an icing event has taken place, ensuring that new data is present. In all of these embodiments, the collection process could include components to screen out already gathered and/or duplicative data. One embodiment of such functionality would involve a mechanism for comparing the file size of available data releases to previously gathered releases. Yet another embodiment could evaluate and screen out data releases with a zero-file size, indicating no new data.

Data collection is generally different for all three data sources mentioned herein (CRREL, METAR, and GHCN). For the CRREL Database, one embodiment involves manually downloading over the Internet an ice storm database hosted on a United States Army server in Geospatial Information System (GIS) shapefile format. The METAR and GHCN data may be retrieved and processed differently. The raw METAR data may be downloaded from NOAA's servers and loaded into a PostgreSQL database for later use. In one embodiment, each hour a data retrieval and transformation process downloads METAR data from a file transfer protocol (FTP) server hosted by the NOAA Meteorological Assimilation Data Ingestion System (MADIS). Once new data becomes available on the server, the process collects all available METAR observations for a respective hour via a single netCDF data file that is downloaded. This file is then opened, parsed, and transformed into comma-separated format (CSV) for storage in a relational database. The processing of the available METAR data within the single file may employ an open-source NOAA-created suite of Linux/Unix commands called MADIS-API. This set of tools enables the extraction and manipulation of METAR data for a respective hour into the formats and standards expected both for storage in a database as well as for use with downstream processes described herein. Other embodiments of the ingest process could utilize bulk download techniques, in addition to ancillary external data sources to obtain the most continuous, high quality METAR dataset possible for the processes herein.

Additionally, raw GHCN data is downloaded from a NOAA server and stored in the original file format on a Linux server. In some implementations, the system 106 essentially replicates a NOAA GHCN HTTP data server locally on hard drive storage twice a day using an open-source Linux/Unix command line utility. This automated syncing process ensures that the latest GHCN data is available on local storage by iteratively comparing the locally stored data to the data available on the NOAA GHCN server. If a specific file on the FTP server is deemed to be updated (whether by a differing file size, modification timestamp, or other metric), the version of the file on the FTP server is downloaded and stored on local storage, replacing the old local file version. Further embodiments could include other bulk retrieval techniques or techniques targeted at specifically downloading specific files from a server rather than full replication.

In a typical implementation, the system 106 has the ability to gather and homogenize different data sources and severity indicators. Therefore, the collection process typically includes standardization of ingested data so that it can be compiled and readily analyzed for calculation of a risk score. The system 106 therefore typically has functionality to alter the ingested data to fit a predetermined metadata scheme so that different data sets can be compared, combined, or whatever manipulation is necessary for later downstream processes. The method of alteration or standardization will differ depending on the data set and user requirements. In an exemplary embodiment, the system 106 may remove duplicated data and unnecessary fields from the raw CRREL data and add metadata fields for later use in assessing severity, such as ice thickness and subjective severity ratings.

Other homogenization techniques such as combining similar data sources under a single table or schema may be utilized as well. For instance, in an exemplary embodiment, the system 106 may process the raw METAR and GHCN data eliminating unnecessary metadata fields and combining into a single table for later input into the system's risk scoring components/functionalities.

The system's 106 risk scoring methodology may use different severity indicators for historical storms. An important severity indicator in this regard is subjective reporting of the event's impact on the affected community. The system 106, in a typical implementation, gathers and collects such severity indicators through scraping and text parsing techniques. The source of such subjective descriptors can be a gathered database of such information. For instance, in an exemplary embodiment, the system 106 gathers textual descriptions of particular ice storms on the CCREL server in HTML files associated with identified storms. Using textual searching and parsing techniques the system 106 identifies where reported ice accretion amounts are contained in the text and converts the text into numerical values, and identifies and quantifies subjective descriptors of the storm, such as the word "worst." The system 106 can also, in various implementations, calculate severity based upon storm size, so the system 106 has the ability to calculate size from ingested data, whether loose, textual descriptions of how many states are affected to, as in the current embodiment, GIS data, which is contained in the CRREL database. The system 106 thus typically gathers both subjective severity information as well as numerical information using scraping and parsing techniques. This can be done is a variety of different ways.

Severity reports may also consist of reports by observers distributed over a series of connected devices, such as the Internet or social media platforms. Some embodiments of the system 106 may have the ability to search for textual descriptions of storms and events on such connected devices or remotely hosted sites, such as HTML or other types of web-pages or social media platforms, to gather ice amount information, subjective descriptors, and/or other indications of severity (such as numbers of people losing electricity and spatial area of the storm). Broader searching for severity information may be commenced upon verification by the system 106 that freezing participation has occurred, which, in one embodiment, could be signaled by the existence of reports of freezing precipitation, such as from GHCN or in the METAR data. Utilizing the time and location associated with the ground station information, the system 106 may be configured to target appropriate sources for web-crawling and other searching methodologies and then use textual parsing to extract severity-related information.

The system also generally ingests freezing precipitation amount data and separately assesses severity based on that amount. The freezing precipitation data can, in some implementations, provide an independent measure of severe storms that, while not capturing ice accretion amounts may be more comprehensive than the data available in the ice storm database for example. In certain embodiments, freezing precipitation amounts may be gathered from the METAR and GHCN data sets. The system 106 may have the capability of calculating total precipitation amounts from a storm even if the collected data sets do not have such a field. For instance, for each METAR station, the "Present Weather" text field provided in the METAR records may be used to identify which, if any, hours of each day had freezing precipitation. The observed precipitation accumulations from these hours may be summed to get the daily freezing rain accumulation totals. This, too, may be done in a variety of different ways.

The relational database, and computer-based memory, disclosed or mentioned herein can take on any number of possible formats. In a general sense, a relational database may include, for example, data stored in a manner to recognize relationships among the stored data. In one exemplary implementation, a relational database may organize data into one or more tables (or "relations") of columns and rows, with a unique key identifying each row, for example. Generally, each table/relation may represent one type of entity or element. The rows may represent instances of that type of entity or element and the columns representing values attributed to that instance. One example of a relational database is a PostgreSQL database. The relational database, of course, may be accompanied by any requisite supporting systems, such as relational database management systems (RDBMS), which typically utilize Structured Query Language (SQL) as the language for querying and maintaining the database.

An exemplary configuration of modules or components within the system 106 is disclosed, for example, in FIG. 2 herein. In some implementations, two or more of the disclosed modules or components (or their associated functionalities) may be combined into one single module or component, and/or any one module or component (or its associated functionalities) can be split into two or more modules or components. Moreover, in some implementations, some (e.g., one or more) of the modules or components may be eliminated. In some implementations, one or more of the connections between the modules or components in system 106 may be modified, added to, and/or dispensed with.

The system 106, and its associated functionalities, may be useful to a wide variety of individuals and/or organizations. One such exemplary user-base would be governmental agencies and non-governmental agencies that are charged with the responsibilities of predicting, publicizing and responding to the effects of ice storms and/or freezing rain events. Additionally, insurer and re-insurers might benefit from the improved risk assessment capabilities that the system 106 embodies.

The collector components (and scrapers) can contain one or more collector instances to collect data from the storm forecast distribution repositories (multiple agencies).

The system 106 may receive input information from any one or more of a variety of different sources, including those specifically mentioned herein, as well as others. Additionally, the system 106 may be configured to output (or make available to users) the data it produces, and make that data easy for a user to leverage, in a variety of different ways. The system 106 may be configured to take into account one or more (or all) of the weather-related data mentioned herein, as well as, perhaps, other weather-related data that may not have been explicitly mentioned herein.

The word "best" as used, for example, in the phrase "best estimate," for example, generally refers to the idea of being very good. To be clear, "best," in this regard, does not require absolute perfection. Best can mean, for example, high accuracy and usefulness.

In various embodiments, the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control (or controlling) the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Some of the operations described in this specification can be implemented as operations performed by a data processing apparatus (e.g., one or more processors) on data stored on one or more computer-readable storage devices or received from other sources.

Unless otherwise indicated, the term "processor," as used herein, can refer to one or more computer-based processors or processing units. Moreover, a "processor," or "processing unit" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions disclosed herein, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a described combination can in some cases be excised from the combination, and certain features disclosed may be combined into different subcombinations or variations thereof.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In various implementations, the functionalities disclosed herein and/or associated with the systems and technologies disclosed herein can be accessed from virtually any kind of electronic computing device(s), including, for example, desktop computers, laptops computers, smart phones, tablet, etc.

Any storage media referred to herein can be or include virtually any kind of media such as electronic, magnetic, optical, electromagnetic, infrared, or semiconductor system (or apparatus or device) or propagation media. Examples of suitable computer-readable media include semiconductor or solid-state memory, magnetic tape, removable computer diskettes, random access memory (RAM), read-only memory (ROM), rigid magnetic disks and/or optical disks.

In some implementations, certain functionalities described herein (e.g., those accessible from a computer-based user terminal) may be provided by a downloadable software application (i.e., an app) or in association with a website. Furthermore, some of the concepts disclosed herein can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The risk calculation system is referred to herein as being automated. In a typical implementation, this means that the computer system itself performs at least some (typically many) of the processes disclosed herein without continual involvement or prompting from a human user.

The phrase computer-readable medium or computer-readable storage medium is intended to include at least all mediums that are eligible for patent protection, including, for example, non-transitory storage, and, in some instances, to specifically exclude all mediums that are non-statutory in nature to the extent that the exclusion is necessary for a claim that includes the computer-readable (storage) medium to be valid. Some or all of these computer-readable storage media can be non-transitory.

Other implementations are within the scope of the claims.

What is claimed is:

1. A computer-based method of identifying ice storm risk across a geographical extent, the method comprising:
    receiving, at a computer-based ice storm risk calculation system, historical data regarding a plurality of past ice storms, wherein the historical data comprises, for each respective one of the plurality of past ice storms, data that indicates:
        a geographical region that was impacted by the ice storm;
        a thickness of accumulated ice that resulted from the ice storm; and
        qualitative data reflecting human observations of the ice storm's impact;
    calculating an ice storm severity index based at least in part, on the geographical region that was impacted by the ice storm, the thickness of the accumulated ice that resulted from the ice storm, or both; and
    validating the calculated ice storm index with the qualitative data reflecting the human observations of the ice storm's impact.

2. The computer-based method of claim 1, further comprising:
    searching the qualitative data reflecting human observations of the ice storm's impact for one or more specific words or phrases that suggest a particular level of severity associated with the ice storm.

3. The computer-based method of claim 2, wherein the qualitative data reflecting human observations of the ice storm's impact comprises one or more published articles, written by humans, describing the ice storm, the method further comprising:
    counting a number of times that the one or more specific words or phrases appear in the one or more published articles, and/or
    counting how many of the one or more published articles include any of the one or more specific words or phrases.

4. The computer-based method of claim 3, wherein searching the qualitative data reflecting human observations of the ice storm's impact for one or more specific words or phrases that suggest a particular level of severity associated with the ice storm comprises searching the one or more published articles for the word "worst."

5. The computer-based method of claim 2, wherein validating the calculated ice storm severity index with the qualitative data reflecting the human observations of the ice storm's impact comprises:
    checking a correlation between the calculated ice storm severity index and occurrences of the one or more specific words or phrases that suggest a particular level of severity associated with the ice storm in the qualitative data.

6. The computer-based method of claim 1, wherein the ice storm severity index for the ice storm is calculated based on:
    a ratio of the size of the geographical region that was impacted by the ice storm versus an average size of geographical regions that were impacted by a plurality of ice storms, and/or
    a ratio of the thickness of the accumulated ice that resulted from the ice storm versus an average thickness of accumulated ice that resulted from the plurality of ice storms.

7. The computer-based method of claim 6, wherein the ice storm severity index is calculated based on this formula:

$$\frac{I_i}{\hat{I}} + \frac{\sqrt{A_i}}{(\sqrt{\hat{A}})},$$

where:
- $I_i$ is an ice thickness associated with the ice storm,
- $\hat{I}$ is an average ice thickness for the plurality of the storms,
- $A_i$ is a spatial area representing the size of the geographical region that was impacted by the ice storm, and
- $\hat{A}$ is an average spatial area representing the size of the geographical region that was impacted by the plurality of ice storms.

8. The computer-based method of claim 1, further comprising:
superimposing a grid that defines a plurality of grid cells over a geographical map, wherein each respective grid cell represents a particular geographical region of the map;
calculating an ice storm severity index for each respective one of the grid cells.

9. The computer-based method of claim 1, wherein receiving, at the computer-based ice storm risk calculation system, historical data regarding the plurality of past ice storms comprises:
downloading from a remote computer-based database of damaging ice storm data, a shapefile associated with the ice storm, other quantitative information about the storm, and scraping one or more hypertext markup language ("HTML") descriptions of published articles.

10. The computer-based method of claim 1, further comprising:
receiving, at the computer-based ice storm risk calculation system, historical data including amounts of precipitation at particular times and locations.

11. The computer-based method of claim 10, wherein the historical data regarding the plurality of past ice storms is downloaded and/or scraped from a first data source, and
wherein the historical data including amounts of precipitation at particular times and locations is downloaded from one or more other data sources different than the first data source.

12. The computer-based method of claim 11, wherein the historical data including amounts of precipitation at particular times and locations comprises:
data from a first precipitation data source that includes daily accumulated freezing rain totals; and
data from a second precipitation data source that includes more frequent indications of freezing rain amounts,
wherein the method comprising identifying a best estimate of daily freezing precipitation based on the data from the first precipitation data source and the second precipitation data source, based on a set of rules stored in computer-based memory.

13. The computer-based method of claim 1, further comprising:
superimposing a grid that defines a plurality of grid cells over a geographical map, wherein each respective grid cell represents a particular geographical region of the map; and
for each respective one of the plurality of grid cells:
calculating a probability that a subsequent ice storm will affect a corresponding geographical region based on the historical data about the plurality of ice storms; and
calculating a probability that a subsequent ice storm will affect a corresponding geographical region based on weather-related data from one or more data sources other than the source that provided the historical data about the plurality of ice storms.

14. The computer-based method of claim 13, further comprising:
for each respective one of the plurality of grid cells, calculating two severity-weighted risk indices (r), each taking into account one of the calculated probabilities.

15. The computer-based method of claim 14, wherein each of the severity-weighted risk indices (r) is calculated based on:

$$r = p_1 + (2 \ast p_2) + \ldots (N \ast p_n), \text{ where}$$

each p is one of the calculated probabilities (in order of increasing severity).

16. The computer-based method of claim 14, further comprising:
for each respective one of the plurality of grid cells, blending the two severity-weighted risk indices (r) to produce a single blended risk index for each cell.

17. The computer-based method of claim 16, further comprising:
applying a spatial smoothing process on the blended risk indexes across the plurality of grid cells to produce a smoothed, blended risk index for each cell.

18. The computer-based method of claim 17, further comprising:
categorizing each respective grid cell into one of a plurality of different risk levels based on the smoothed, blended risk index for that cell.

19. The computer-based method of claim 18, further comprising:
providing access, at a computer-based user terminal, to a gridded geographic map with a plurality of grid cells, wherein each respective grid cell has a corresponding risk level that is viewable or accessible from the computer-based user terminal.

20. A computer system comprising:
a plurality of data sources;
a computer-based ice storm risk calculation system; and
a plurality of computer-based user terminals,
wherein the plurality of data sources, the computer-based ice storm risk calculation system, and the plurality of computer-based user terminals are coupled to one another for communication via a network,
wherein the computer-based ice storm risk calculation system comprises:
a computer-based processor; and
a computer-based memory coupled to the computer-based processor,
wherein the computer-based processor is configured to execute instructions stored in the computer-based memory to perform the steps comprising:
receiving historical data regarding a plurality of past ice storms from a first one of the data sources, wherein the historical data comprises, for each respective one of the plurality of past ice storms, data that indicates:
a geographical region that was impacted by the ice storm;
a thickness of accumulated ice that resulted from the ice storm; and qualitative data reflecting human observations of the ice storm's impact;

calculating an ice storm severity index based at least in part, on the geographical region that was impacted by the ice storm, the thickness of the accumulated ice that resulted from the ice storm, or both; and validating the calculated ice storm index with the qualitative data reflecting the human observations of the ice storm's impact, wherein the computer system is configured to make available at one or more of the computer-based user terminals a gridded geographic map with a plurality of grid cells, wherein each respective grid cell has a corresponding risk level that is viewable or accessible from the computer-based user terminal.

* * * * *